US012687721B2

(12) United States Patent
Curtis et al.

(10) Patent No.:  US 12,687,721 B2
(45) Date of Patent:       Jul. 21, 2026

(54) SINGLE PUPIL RGB LIGHT SOURCE

(71) Applicant: Magic Leap, Inc., Plantation, FL (US)

(72) Inventors: Kevin Richard Curtis, Boulder, CO (US); Heidi Leising Hall, Webster, NY (US); Jahja I. Trisnadi, Cupertino, CA (US)

(73) Assignee: Magic Leap, Inc., Plantation, FL (US)

( * ) Notice: Subject to any disclaimer, the term of this patent is extended or adjusted under 35 U.S.C. 154(b) by 289 days.

(21) Appl. No.: 18/260,708

(22) PCT Filed: Jan. 7, 2022

(86) PCT No.: PCT/US2022/070097
§ 371 (c)(1),
(2) Date: Jul. 7, 2023

(87) PCT Pub. No.: WO2022/150843
PCT Pub. Date: Jul. 14, 2022

(65) Prior Publication Data
US 2024/0061249 A1     Feb. 22, 2024

Related U.S. Application Data

(60) Provisional application No. 63/165,663, filed on Mar. 24, 2021, provisional application No. 63/135,533, filed on Jan. 8, 2021.

(51) Int. Cl.
*G02B 27/01*          (2006.01)
*F21V 8/00*           (2006.01)

(52) U.S. Cl.
CPC ....... *G02B 27/0172* (2013.01); *G02B 6/0073* (2013.01); *G02B 6/0076* (2013.01);
(Continued)

(58) Field of Classification Search
CPC ............. G02B 27/0172; G02B 6/0073; G02B 6/0076; G02B 2027/0112;
(Continued)

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |

(Continued)

OTHER PUBLICATIONS

International Preliminary Report on Patentability and Written Opinion mailed Jul. 20, 2023, for PCT Application No. PCT/US2022/070097, filed Jan. 7, 2022, eight pages.
(Continued)

*Primary Examiner* — Mariam Qureshi
(74) *Attorney, Agent, or Firm* — Zi Y. Wong; Via LLP

(57)                    ABSTRACT
Embodiments of this disclosure systems and methods for displays. In embodiments, a display system includes a light source configured to emit a first light, a lens configured to receive the first light, and an image generator configured receive the first light and emit a second light. The display system further includes a plurality of waveguides, where at least two of the plurality of waveguides include an incoupling grating configured to selectively couple the second light. In some embodiments, the light source can comprise a single pupil light source having a reflector and a micro-LED array disposed in the reflector.

20 Claims, 42 Drawing Sheets

(52) U.S. Cl.
  CPC ................ *G02B 2027/0112* (2013.01); *G02B 2027/0178* (2013.01)

(58) Field of Classification Search
  CPC ........ G02B 2027/0178; G02B 19/0023; G02B 19/0066; G02B 6/0011; G02B 27/0081
  See application file for complete search history.

(56) References Cited

U.S. PATENT DOCUMENTS

| | | | |
|---|---|---|---|
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,323,325 | B2 | 4/2016 | Perez et al. |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 2003/0030597 | A1 | 2/2003 | Geist |
| 2006/0023158 | A1 | 2/2006 | Howell et al. |
| 2008/0192153 | A1 | 8/2008 | Kuhn |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2012/0038892 | A1 | 2/2012 | Kurtz |
| 2013/0077147 | A1 | 3/2013 | Efimov |
| 2014/0085888 | A1 | 3/2014 | Svensen |
| 2014/0195918 | A1 | 7/2014 | Friedlander |
| 2015/0168731 | A1 | 6/2015 | Robbins |
| 2017/0343186 | A1 | 11/2017 | Wang |
| 2020/0124834 | A1* | 4/2020 | Woodgate ............ G09G 3/3406 |
| 2020/0371358 | A1* | 11/2020 | Ouderkirk .......... G02B 27/0172 |
| 2020/0409156 | A1 | 12/2020 | Sissom et al. |
| 2022/0157230 | A1* | 5/2022 | Suzuki .................... G09G 3/32 |

FOREIGN PATENT DOCUMENTS

| | | | |
|---|---|---|---|
| CA | 2388766 | A1 | 12/2003 |
| JP | 2000199886 | A | 7/2000 |
| JP | 2009516862 | A | 4/2009 |
| JP | 2020502783 | A | 1/2020 |
| JP | 2020025064 | A | 2/2020 |
| JP | 6803595 | B1 | 12/2020 |
| WO | 2019118357 | A1 | 6/2019 |
| WO | WO-2019178060 | A1 * | 9/2019 ......... G02B 27/0018 |

OTHER PUBLICATIONS

European Search Report dated May 27, 2024, for EP Application No. 22737350.3, nine pages.

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Jacob, "Eye Tracking in Advanced Interface Design," Virtual environments and advanced interface design, 1995, 258:288, 50 pages.

* cited by examiner

RIGHT SOURCE
OF IMAGEWISE
MODULATED
LIGHT

300

350

350

348          304

346

320

2106          2128

Eyepiece

1300

1400

1600

SINGLE PUPIL RGB LIGHT SOURCE

CROSS REFERENCE TO RELATED APPLICATIONS

This application is a national stage application 35 U.S.C § 371 of International Application No. PCT/US2022/070097, filed internationally on Jan. 7, 2022, which claims priority to U.S. Provisional Application No. 63/135,533, filed on Jan. 8, 2021, and U.S. Provisional Application No. 63/165,663, filed on Mar. 24, 2021, the contents of which are incorporated by reference herein in their entirety.

FIELD

This disclosure relates in general to systems and methods for displaying visual information, and in particular to systems and methods for displaying visual information in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems, which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

Presenting a virtual environment in a realistic manner to create an immersive experience for the user can be difficult. For example, head mounted displays are designed to be light and compact to minimize strain on the user and while presenting a high quality image with a wide field of view ("FOV"). Real-world design constraints, however, may result in a tradeoff between the size and weight of an optical system of the head wearable device and the quality of the displayed image. The quality of the image may be based on, for example, the efficiency of the optical system, e.g., one that does not lose light, uniformity of color, and field of view. Thus, there exists a need for a compact optical system, such as for presenting virtual environments in VR, AR, or MR systems, that is efficient and has a wide field of view.

BRIEF SUMMARY

Disclosed herein are systems and methods for displays, such as for a head wearable device. An example display system can include a light source configured to emit a first light, a lens configured to receive the first light, and an image generator configured receive the first light and emit a second light. The display system may further include a plurality of waveguides, where at least one of the plurality of waveguides can include an in-coupling grating configured to selectively couple the second light. In some embodiments, the light source can comprise a single pupil light source having a reflector and a micro-LED array disposed in the reflector. Embodiments disclosed herein may provide a compact and efficient display system.

DETAILED DESCRIPTION

Figure 1A:
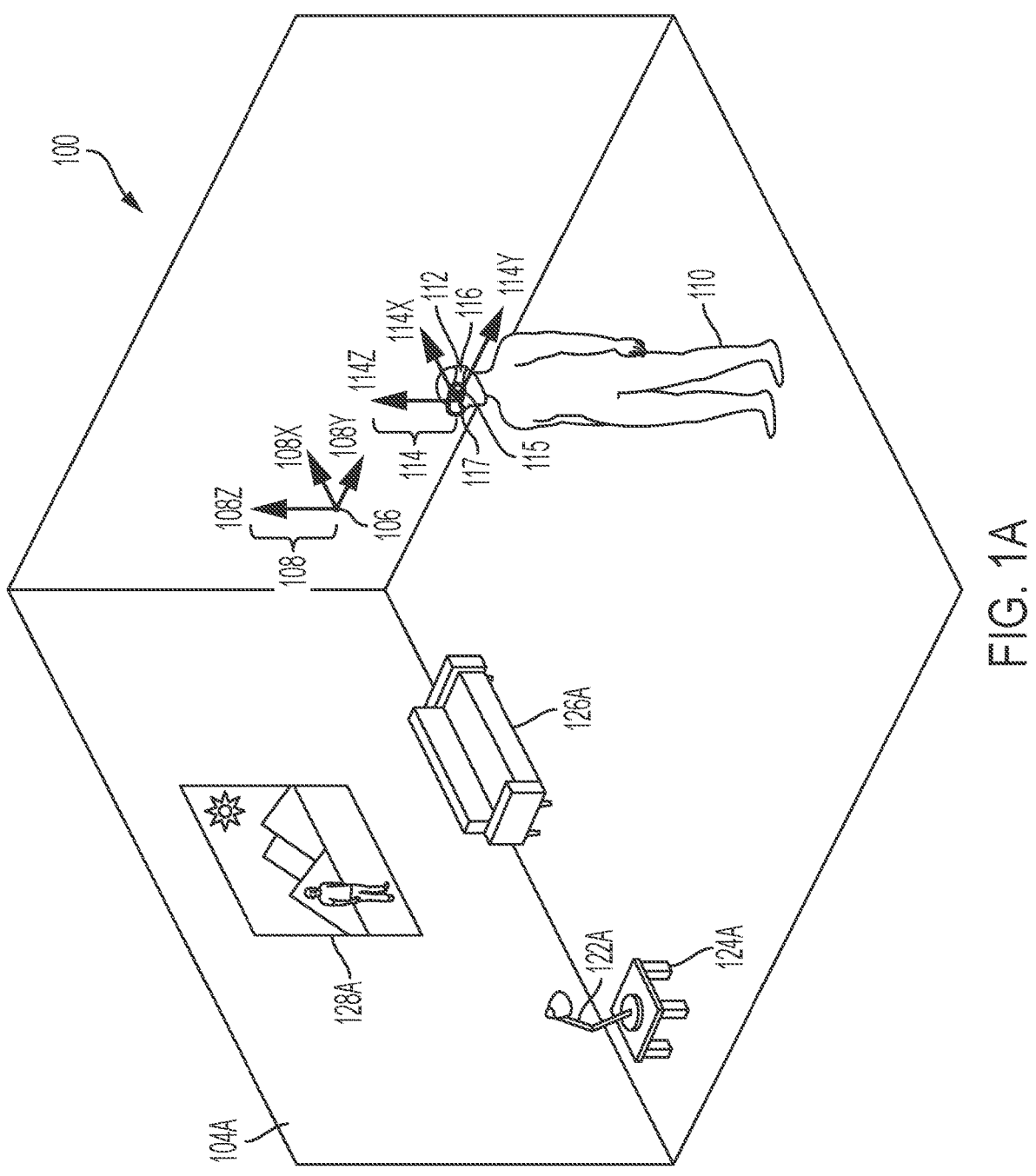
FIGS. 1A-1C illustrate an example mixed reality environment, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
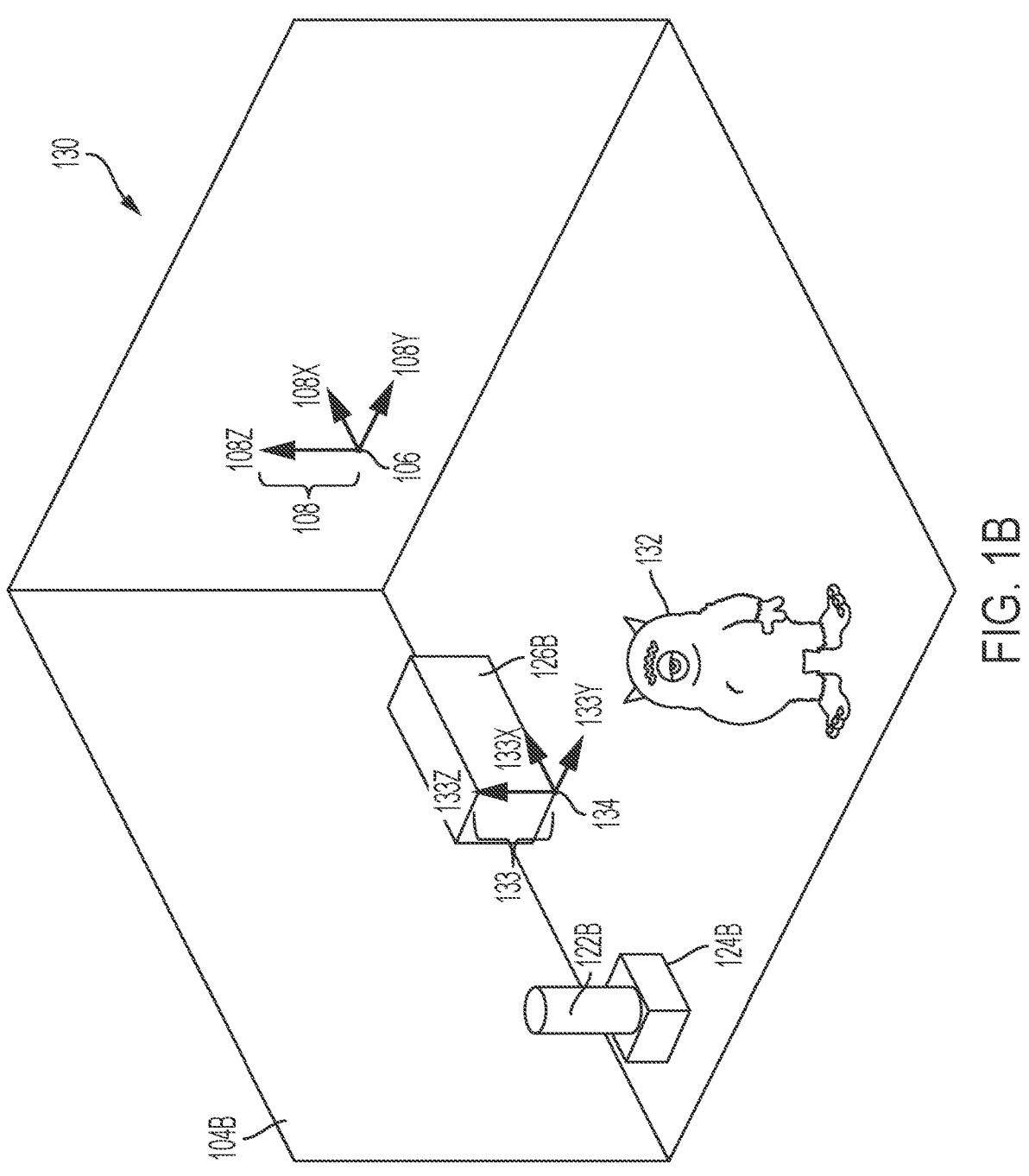

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, and 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/ with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
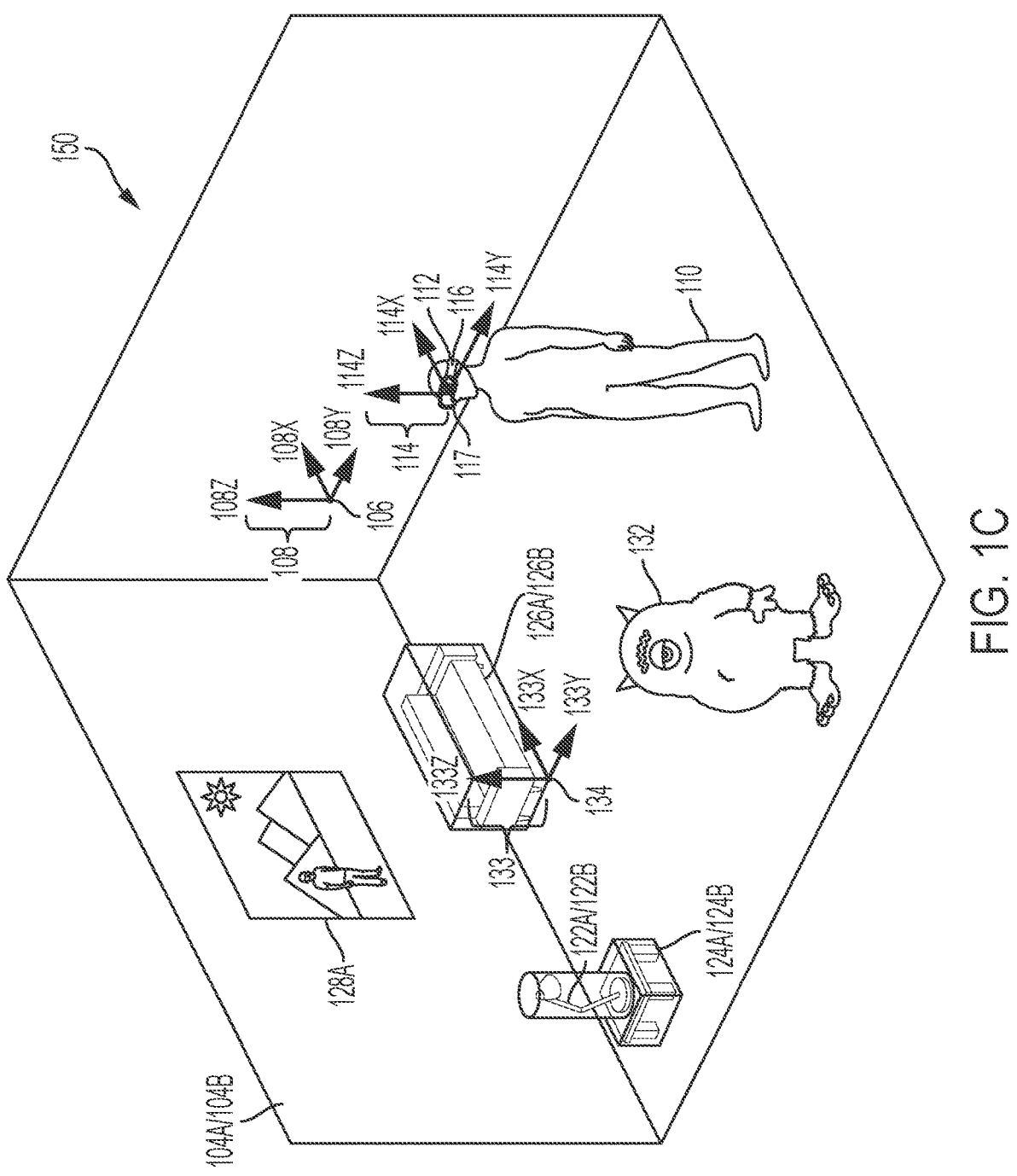

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
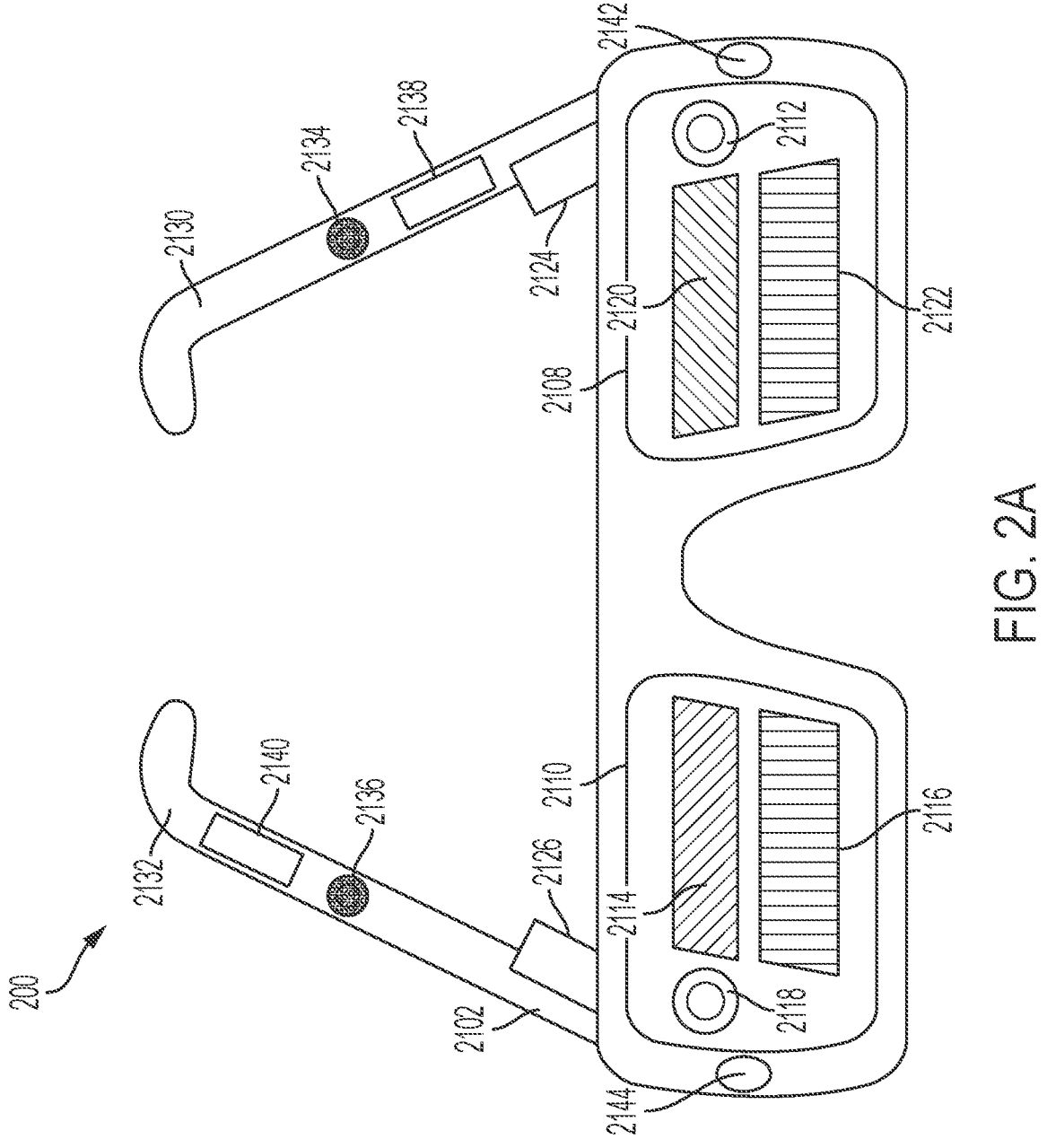
FIGS. 2A-2D illustrate components of an example mixed reality system that can be used to generate and interact with a mixed reality environment, according to one or more embodiments of the disclosure.
Figure 2B:
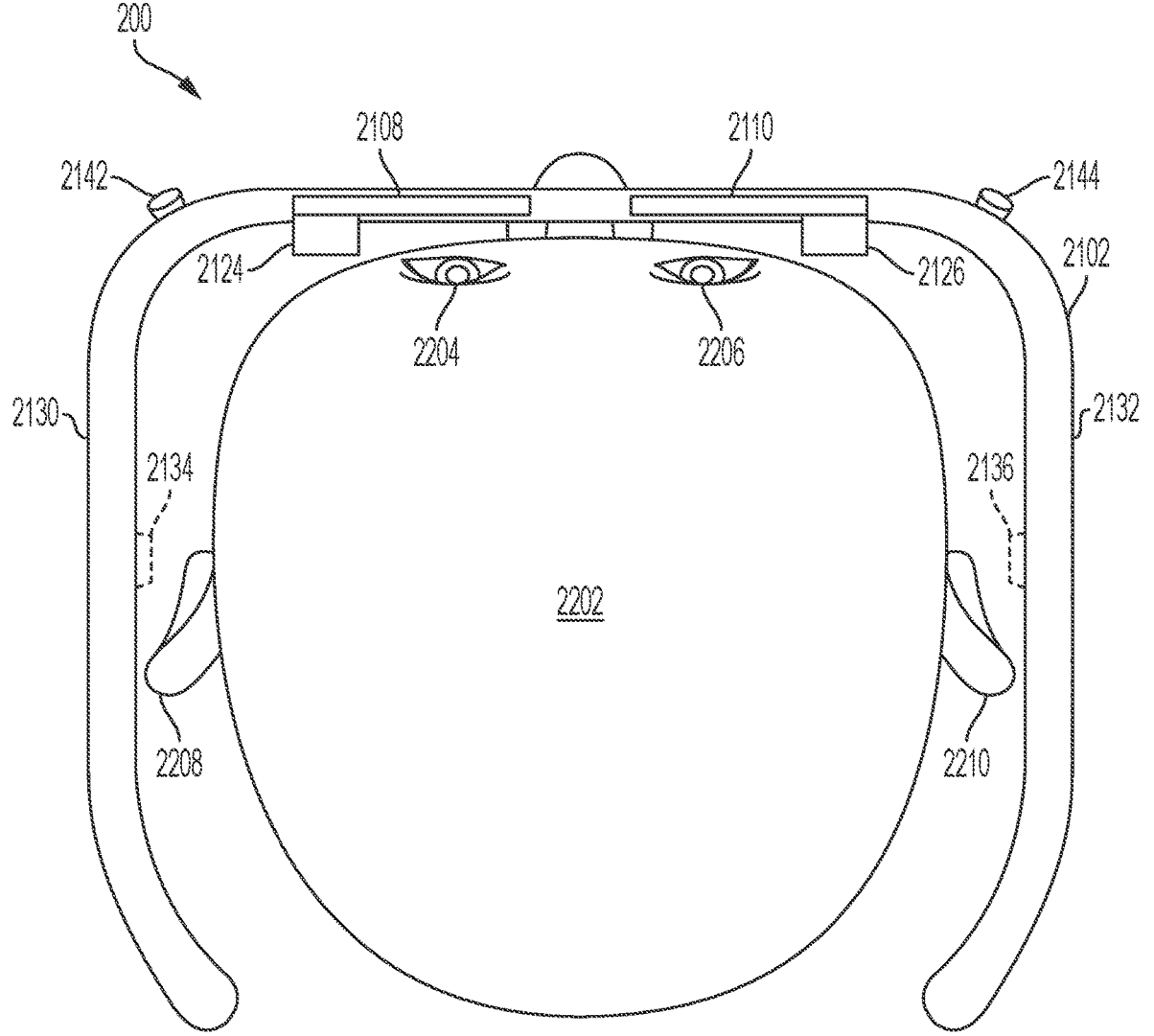
Figures 2C, 2D:
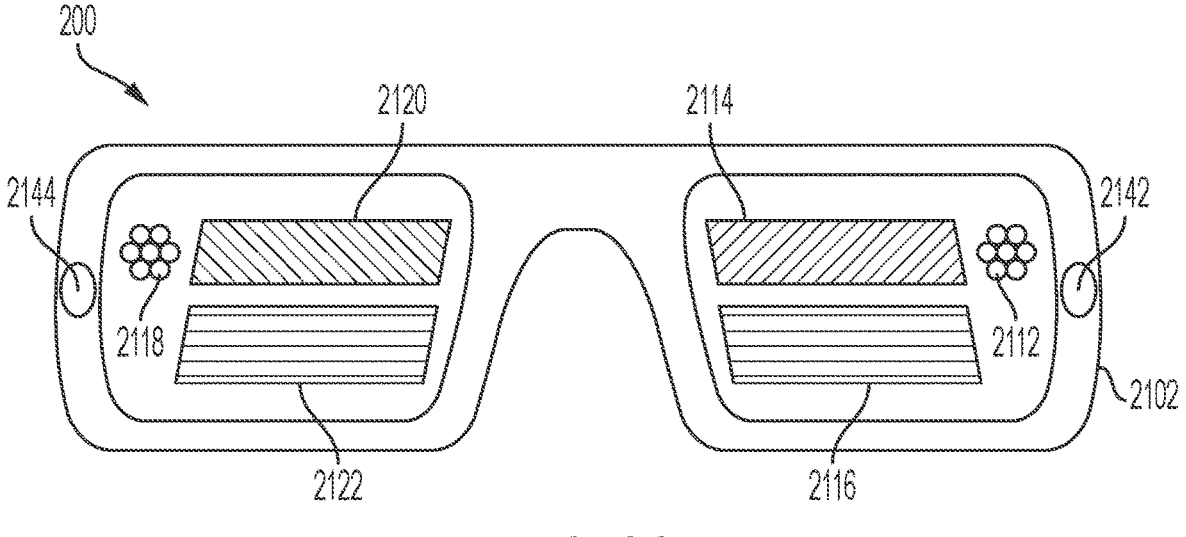

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left in-coupling grating set 2112, a left orthogonal pupil expansion (OPE) grating set 2120, and a left exit (output) pupil expansion (EPE) grating set 2122. As used herein, a pupil may refer to the exit of light from an optical element such as a grating set or reflector. Similarly, the right eyepiece 2110 can include a right in-coupling grating set 2118, a right OPE grating set 2114 and a right EPE grating set 2116. Imagewise modulated light can be transferred to a user's eye via the in-coupling gratings 2112 and 2118, OPEs 2114 and 2120, and EPE 2116 and 2122. Each in-coupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the in-coupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left in-coupling grating set 2112, and a right source of imagewise modulated light 2126 can be optically coupled into the right eyepiece 2110 through the right in-coupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the in-coupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
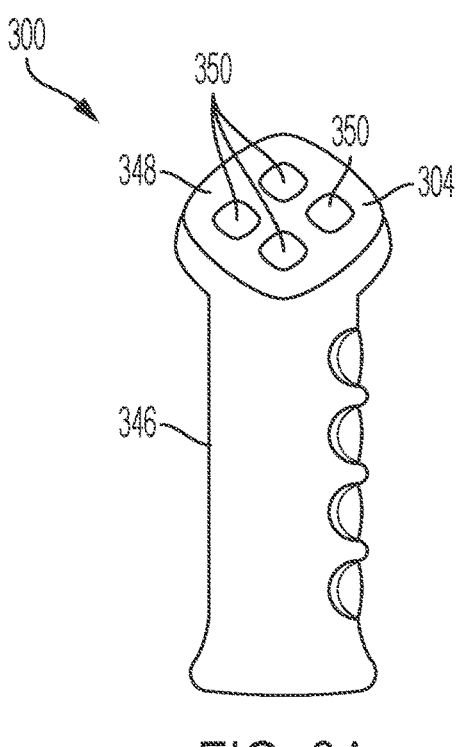
FIG. 3A illustrates an example mixed reality handheld controller that can be used to provide input to a mixed reality environment, according to one or more embodiments of the disclosure.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
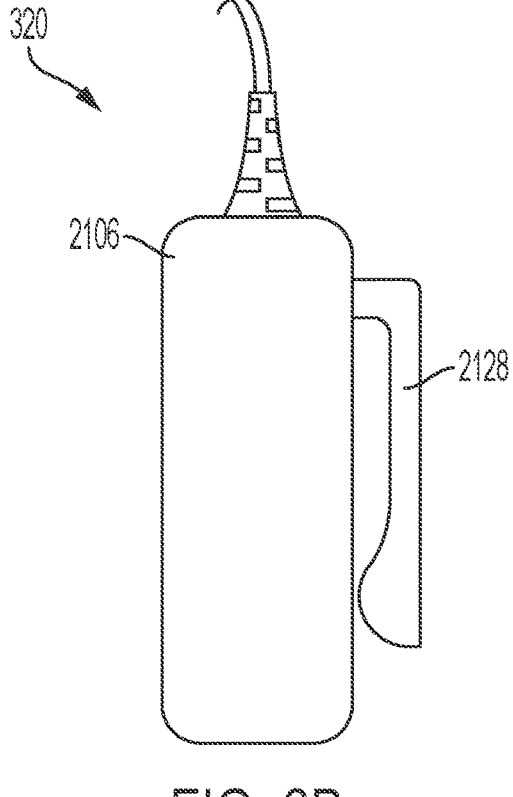
FIG. 3B illustrates an example auxiliary unit that can be used with an example mixed reality system, according to one or more embodiments of the disclosure.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
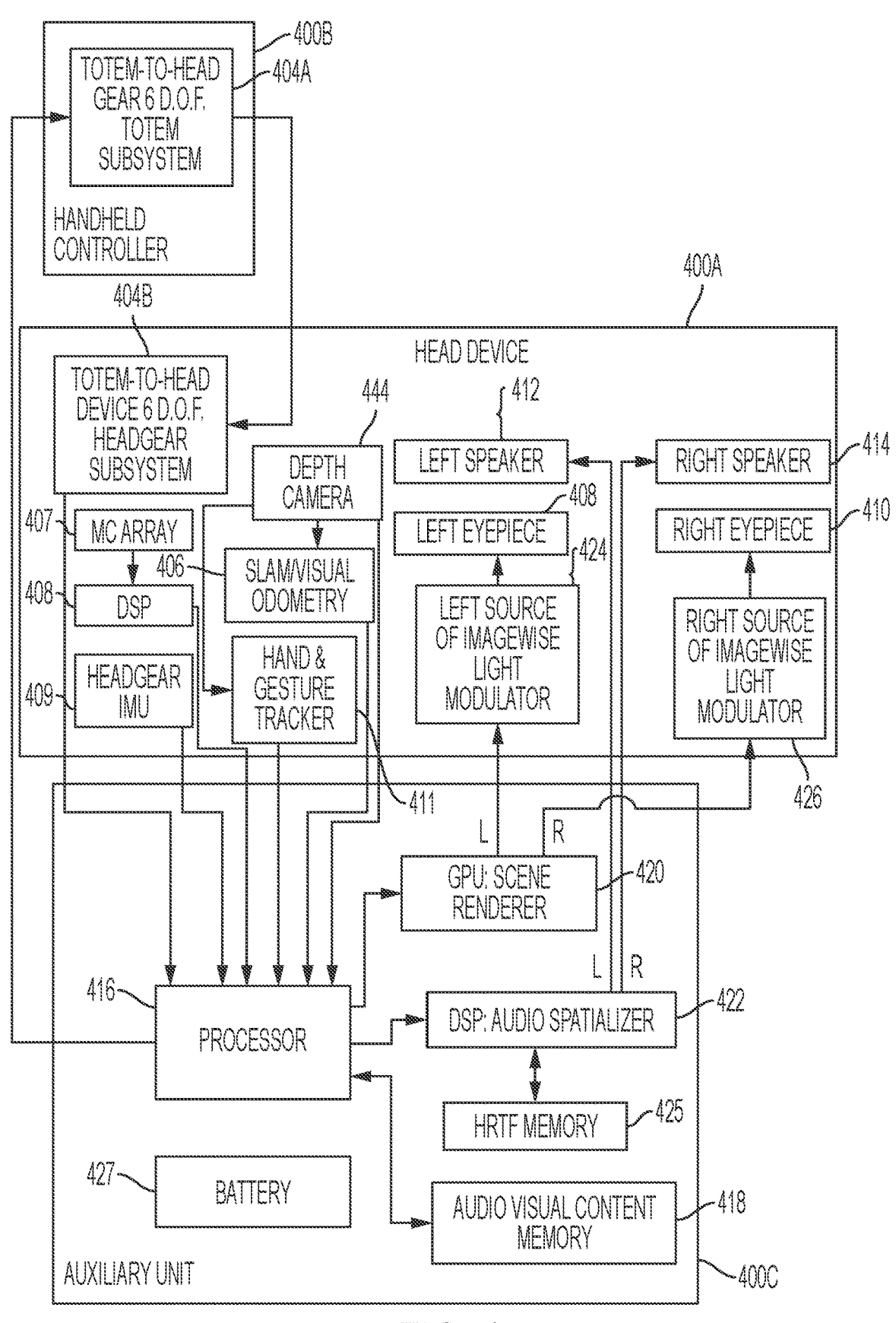
FIG. 4 illustrates an example functional block diagram for an example mixed reality system, according to one or more embodiments of the disclosure.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Example Optical Systems

A wearable head device of an example mixed reality system (e.g., mixed reality system 200) may include an optical system for presenting an image to a user via a display. FIGS. 5-7 and 8A-8C illustrate examples of optical systems that can be used in a wearable head device (e.g., wearable head device 2102).

Figures 5, 6:
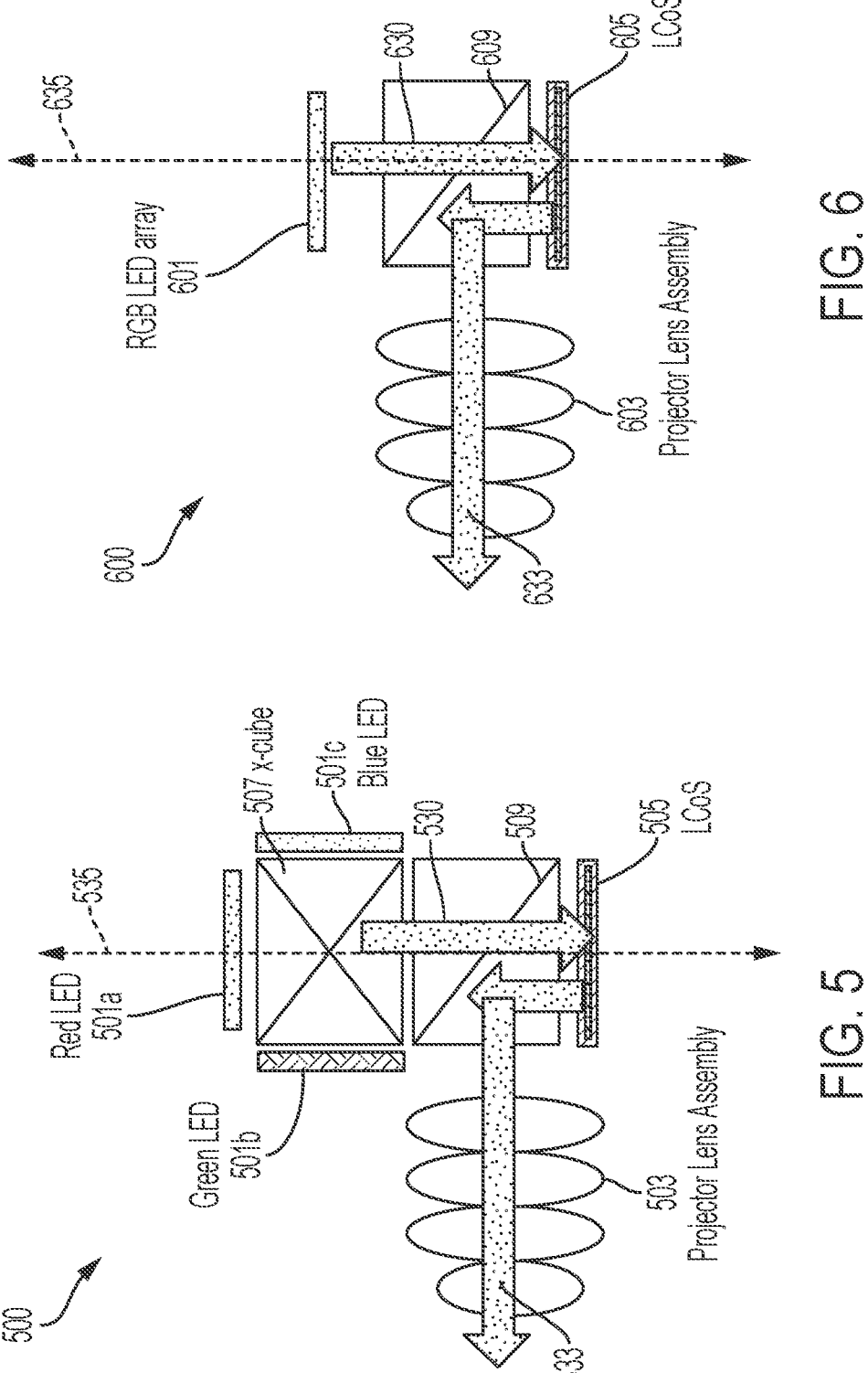
FIG. 5 illustrates an example optical system for an example mixed reality system, according to one or more embodiments of the disclosure.
FIG. 6 illustrates an example optical system for an example mixed reality system, according to one or more embodiments of the disclosure.

FIG. 5 illustrates an example optical system 500 which may be used in a wearable head device (e.g., wearable head device 2102). The optical system 500 can include a light source that includes a plurality of LEDs 501*a-c* and a prism 507, an image generator 505, an angled partially-transmissive partially-reflective surface 509, and a projector lens assembly 503. In some embodiments, the image generator can include a spatial light modulator such as an LcoS (liquid crystal on silicon).

As illustrated in the figure, the plurality of LEDs 501*a-c* may include at least one of a red LED 501*a*, a green LED 501*b*, and a blue LED 501*c*. The plurality of LEDs may be arranged to project light into the prism 507. In some embodiments, the prism 507 may be an x-cube that is configured to combine the light from each of the LEDs 501*a-c* and output the light 530 to an image generator 505. The prism 507 may result in some inefficiencies where a portion of the light entering the prism may be lost, e.g., scattered. In addition the x-cube typically has image artifacts associated with the intersection of the various prisms. In some embodiments, the light 530 may pass through a partially-transmissive partially-reflective surface 509 before being received by the image generator 505. As shown in the figure, the light source, e.g., plurality of LEDs 501*a-c* and prism 507, are positioned such that light 530 emitted by the prism 507 is on-axis with respect to axis 535 (that is, the light 530 is aligned along axis 535), and coaxial with the image generator 505.

The image generator 505 may receive light 530 and reflect it to form image light 533. The image light 533 output by the image generator 533 may be reflected by the partially-transmissive partially-reflective surface 509 toward a projector lens assembly 503. A portion of light 530 and image light 533 passing through and/or reflected by the partially-transmissive partially-reflective surface 509 may be lost, e.g., scattered or transmitted away from lens 503. An eyepiece of a head wearable device can be configured to receive the image light 533 and present it to a user. In some embodiments, the field-of-view (FOV) of optical system 500 can be 55 degrees. This 55 degree FOV of system 500 may be based on the focal length of the lens assembly 503. As illustrated in FIG. 5, the width of the lens assembly 503 (and correspondingly, the focal length) may be limited by the size, e.g., footprint, of the image generator 505 and light source 501. In some embodiments, lens 503 may have a shorter focal length lens 503, which can increase the FOV. However, the available space, e.g., footprint, for shortening the focal length, is limited by the prism or beamsplitter. Practically, this can limit the achievable field of view to 55 degrees.

FIG. 6 illustrates an example optical system 600, which may be used in a wearable head device (e.g., wearable head device 2102). The optical system 600 can include a light source that includes a RGB LED array 601, an image generator 605, e.g., a spatial light modulator such as an LCoS, an angled partially-transmissive partially-reflective surface 609, and a projector lens assembly 603. The optical system 600 may be more compact than the optical system 500. For example, the optical system 600 need not include a prism to combine the light from the light source, thereby conserving physical space.

As illustrated in the figure, the light source 601 may include an RGB LED array that emits light 630 to the image generator 605. In some embodiments, the light 630 may pass through a partially-transmissive partially-reflective surface 609 before being received by the image generator 605. A portion of light 630 and image light 633 passing through and/or reflected by the partially-transmissive partially-reflective surface 609 may be lost, e.g., scattered. In the example, the light source 601 and the image generator 605 are located on the same axis (635), such that light from the light source 601 is delivered along this axis to the image generator 605. The image light 633 output by the image generator 633 may be reflected by the partially-transmissive partially-reflective surface 609 toward a projector lens assembly 603. An eyepiece of a head wearable device can be configured to receive the image light 633 and present it to a user. In some embodiments, the field-of-view (FOV) of optical system 600 can be up to, e.g., 55 degrees.

Figure 7:
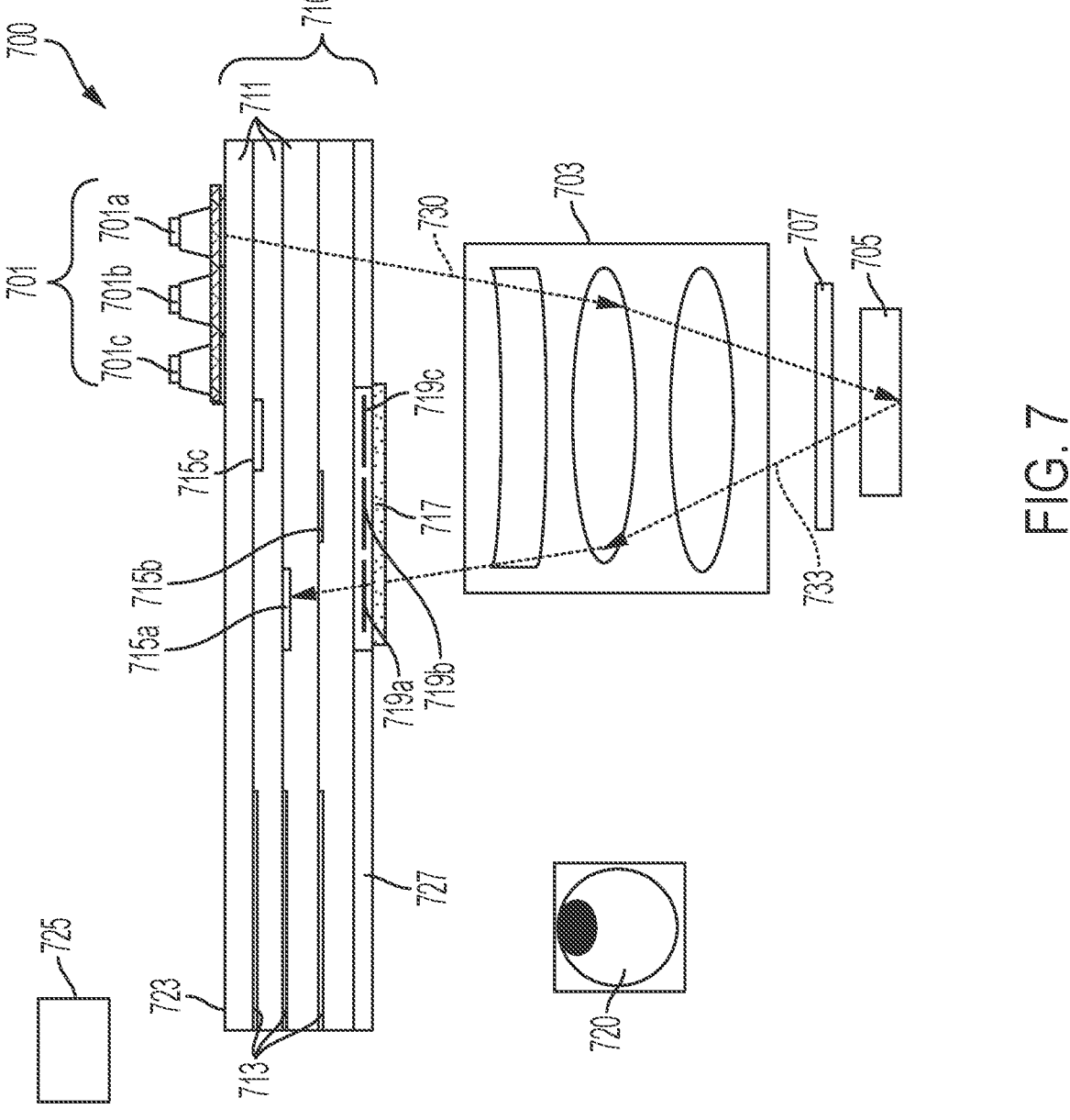
FIG. 7 illustrates an example optical system for an example mixed reality system, according to one or more embodiments of the disclosure.

FIG. 7 illustrates a top-down view of an example optical system 700 which may be used in a wearable head device (e.g., wearable head device 2102). As shown in this figure, the optical system 700 can include, for example, a light source 701, a lens assembly 703, an image generator 705, e.g., a spatial light modulator such as an LCoS, color filters 719, and a plurality of waveguides 711. In some embodiments the optical system 700 may further include a polarizer positioned between the light source 701 and the plurality of waveguides 711.

The plurality of waveguides 711 may be arranged in parallel to form a waveguide stack 710. The waveguide stack 710 may be configured such that a first face 723 of the waveguide stack 710 is exposed to the real-world environment 725 and a second face 727 of the stack is distal to the real-world environment 725, e.g., facing an eye 720 of a user wearing a wearable head device. The optical system 700 may also include a circular polarizer 717 and a optical element stack 707 (referred to here as "MSP"), which may include a polarizer (e.g., a linear polarizer) between a first quarter wave plate and a second quarter wave plate.

The light source 701 may include one or more LED sources 701*a-c*. In some embodiments, an LED source may include an LED disposed in a reflector, for example, a CPC reflector. As illustrated in the figure, light source 701 includes three separate LED sources 701*a-c*. The three LED sources may each correspond to a primary color, red, green, and blue. In some embodiments, each of the LED sources may have an exit pupil or exit aperture of about 1 mm. The light source 701 may be disposed on the first face 723 of the waveguide stack 710. The light source may be located near a temple region of a head wearable display (such as shown in FIG. 2A). The light source 701 may be configured to direct light 730 through the waveguide stack 710 and toward the lens assembly 703 and image generator 705. Compared to example optical systems 500 and 600, the light source 701 and the image generator 705 as shown are off-axis, e.g., the axes of the light source 701 and the image generator 705 are not aligned.

The light 730 generated by the light source 701, e.g., by LED sources 701*a-c*, reaches the image generator 705 by passing through the plurality of waveguides 711 and lens assembly 703. In some embodiments, the optical system 700 can be arranged such that the light from the light source 701 is transmitted through the plurality of waveguides 711 but not through color filters 719 and/or polarizer 717. The light 730 can pass through the color filters 719 and/or polarizer 717 after being reflected from image generator 705 as discussed in more detail below. The lens assembly 703 can be configured to direct the light 730 to the image generator 705. In some embodiments, an MSP 707 may be located between the lens assembly 703 and the image generator 705. Thus, the light 730 may pass through the MSP 707 before entering the image generator 705. The optical system 700 illustrated in FIG. 7 may have a relatively large FOV (e.g., compared to optical systems 500 and 600) because large optical elements such as prisms, beam splitters, and waveguides positioned between the lens and the image generator may be omitted.

The image generator 705 can reflect the incoming light 730 to generate image light 733. In some embodiments, the image generator can be a spatial light modulator such as an LCoS. The image light 733 may pass through the MSP 707 upon exiting the image generator 705. In some embodiments, the MSP 807 may be tilted to minimize the effect of reflections in the system on the image presented to the user. The image light 733 may then enter the lens assembly 703, where it is directed towards the waveguide stack 710. Upon reaching the second face 727 of the waveguide stack 710, the image light 733 may pass through a circular polarizer 717 and/or a color filter 719. The circular polarizer 717 can polarize the image light 733, while the color filter can filter out wavelengths that do not correspond to the wavelength of light output by the light source 701. In some embodiments, the optical system 700 may not include the color filters 719, e.g., the light 730 may be selectively in-coupled into the waveguide stack via the in-coupling grating.

In-coupling gratings 715*a-c* can then receive the filtered light. Each in-coupling grating may be configured to diffract or couple-in light of a particular wavelength into the corresponding waveguide. In other words, each of LED sources 701*a-c* may each output light at a particular wavelength and a corresponding color filter 719 and in-coupling grating 715 may be tuned to the same wavelength. For example, color filter 719*a* can filter out wavelengths that do not correspond to the wavelength output by light source 701*a*; and in-coupling grating 715*a* can be configured to diffract light corresponding to the wavelength output by LED source 701*a*.

As shown in FIG. 7, each of the LED sources 701*a-c* of optical system 700 are spatially separated. The LED sources 701*a-c* may be spatially separated in both a horizontal and vertical direction. Similarly, the in-coupling gratings 715*a-c* may be spatially separated both horizontally and vertically. Thus, light emitted from each of the LED sources may travel along a different path to reach a respective in-coupling grating 715*a-c*. For example, light emitted from LED source 701*a* can be spatially separated (vertically and horizontally) from light emitted from LED source 701*b*. Moreover, image light received at in-coupling grating 715*a*, corresponding to light emitted from LED source 701*a*, can be spatially separated (vertically and horizontally) from light received by in-coupling grating 715*b*, corresponding to light emitted from LED source 701*b*. This spatial separation of light sources and in-coupling gratings can limit color crosstalk.

As illustrated in FIG. 7, the optical system 700 can provide a relatively compact configuration, e.g., compared to optical systems 500 and 600. As discussed above, in the example shown, the light source 701 and the image generator 705 are located off-axis from each other, which allows the lens assembly 703 to direct light both to and from the image generator 705. As such, the lens assembly can be tuned to have a shorter focal length, and hence a wider field of view, and the image generator can be disposed on a back face of the lens assembly. This may reduce the overall depth of the optical system 700, e.g., compared to optical system 500 and 600. Further, the FOV of the optical system 700 may be larger, e.g., a FOV of 70-100 degrees. Additionally, the optical system 700 may be more efficient, as less light is lost to various optical components, e.g., prism and partially-transmissive partially-reflective surface.

Figure 8A:
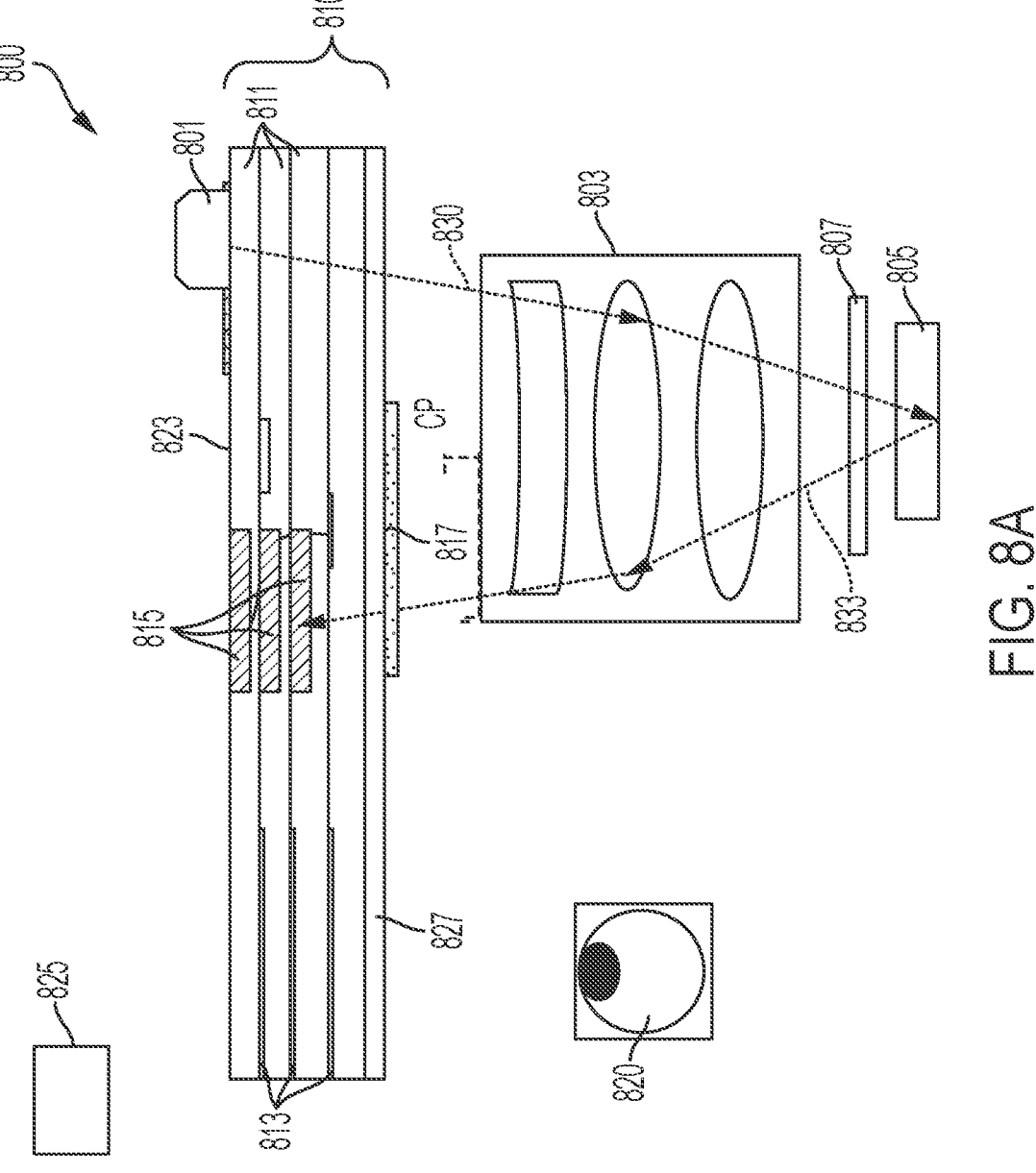
FIGS. 8A-8C illustrate example optical systems for an example mixed reality system, according to one or more embodiments of the disclosure.
Figure 8B:
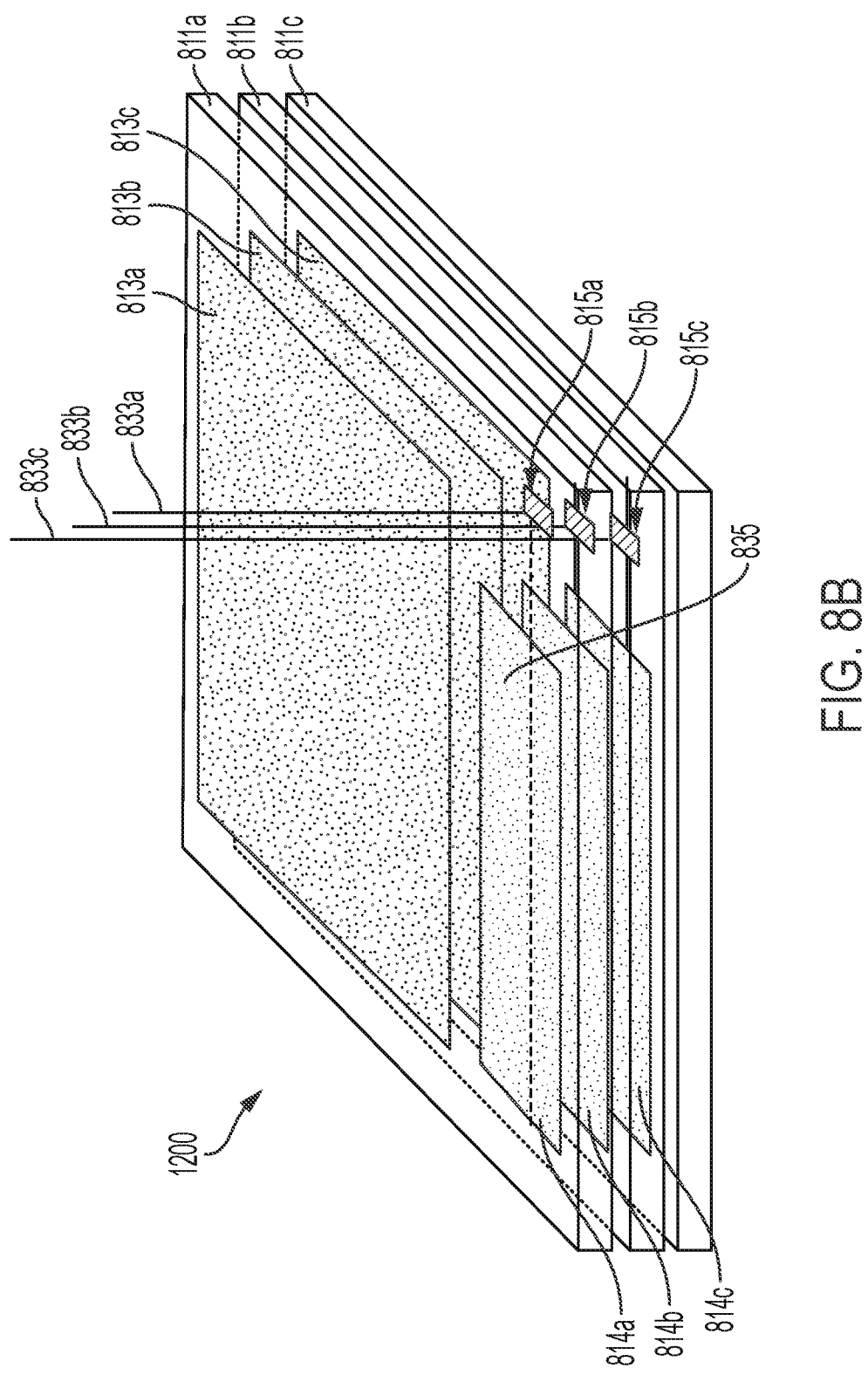
Figure 8C:
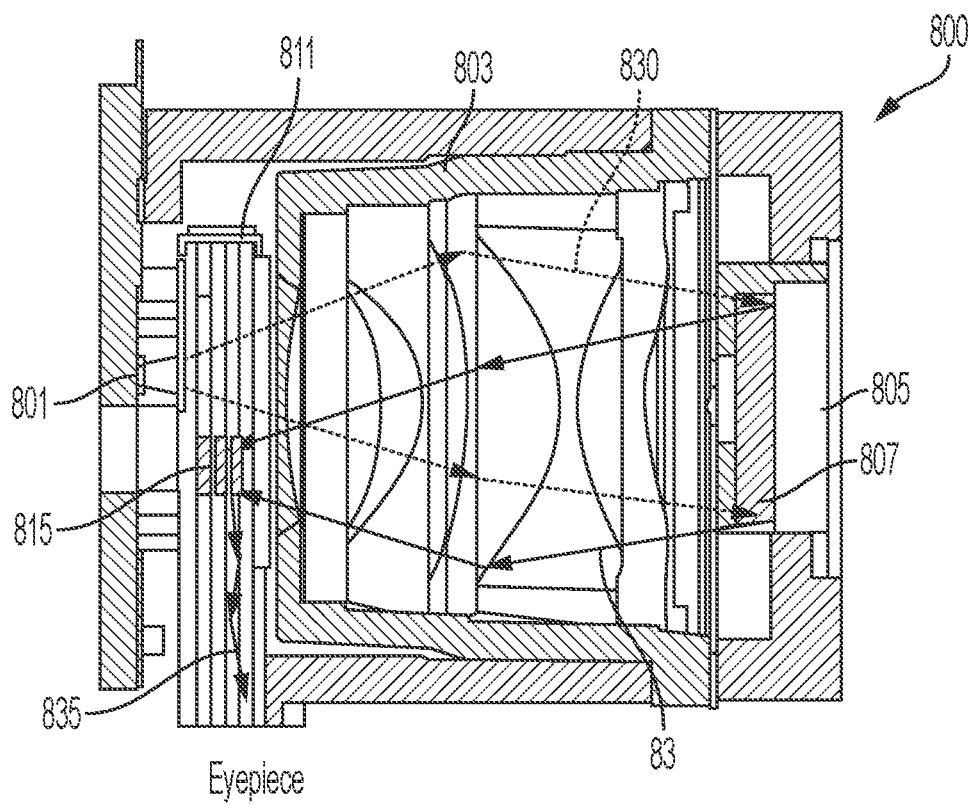

FIGS. 8A-8C illustrate examples of an optical system 800 which may be used in a wearable head device (e.g., wearable head device 2102) in accordance with embodiments of this disclosure. FIG. 8A shows a top down view of the optical system 800 which may be used in a wearable head device in accordance with embodiments of this disclosure. FIG. 8B shows a perspective view of the waveguide stack of optical system 800 which may be used in a wearable head device in accordance with embodiments of this disclosure. FIG. 8C shows another view of the optical system which may be used in a wearable head device in accordance with embodiments of this disclosure. The optical system 800 can be used to output light and/or images, for example to a user of a wearable head device. As will be understood by a skilled artisan, each of these figures show optical systems for a single eye. The systems may be duplicated or otherwise modified for both eyes.

FIG. 8A illustrates a top down view of the optical system 800 which may be used in a wearable head device in accordance with embodiments of this disclosure. The optical system 800 may include, for example, a light source 801, a lens assembly 803, an image generator 805, and a plurality of waveguides 811. The plurality of waveguides 811 may be arranged in parallel to form a waveguide stack 810. The waveguide stack 810 may be configured such that a first face 823 of the waveguide stack 810 is exposed to a real-world environment 825 and a second face 827 of the stack is distal to the real-world environment 825, e.g., facing an eye 820 of a user wearing a wearable head device. The optical system 800 may also include a circular polarizer 817 and an MSP 807. The circular polarizer may be located on a second face 824 of the waveguide stack 810. The MSP 807 may be located between the lens assembly 803 and the LCOS 805. In some embodiments, the optical system 800 may include color filters (not shown). In some embodiments, the plurality of waveguides 811 may be truncated so that the light 830 from the light source 801 does not pass through the waveguides 811 or passes through one or more, but not all, of the waveguides, on its path to the image generator 805. This configuration may decrease losses of light. In some embodiments, the light source may further include a polarizer between the CPC reflector's exit pupil and the waveguides.

The optical system 800 can include a single light source 801. In some embodiments, the light source 801 may include a spatial light modulator, for example, a single CPC reflector with a micro-LED array disposed inside. The micro-LED array can be disposed across the bottom of the CPC reflector or inside the entrance pupil in the CPC reflector. In some embodiments, the reflector may have an exit pupil diameter of about 1-1.3 mm. The micro-LED array can be an RGB micro-LED array that includes a plurality of red, green, and blue LEDs. The micro-LED array can be configured to sequentially turn on and off all of the LEDs corresponding to a specific color. For example, the micro-LED can be configured to turn on and off all green LEDs simultaneously, turn on and off all the red LEDs simultaneously, and turn on and off all blue LEDs simultaneously in such a pattern as to form a sequential RGB light source. The CPC reflector can collect and shape the light from the micro-LED sources, which typically have Lambertian or near Lambertian angular distributions. In this manner, the CPC reflector may form an exit pupil size that is optimized for the optical system and ICGs. The CPC reflector may also provide light with an optimal angular extent corresponding to the FOV of the system. Thus, the light source 801 can provide a uniform and efficient light source in a small, e.g., single-source, package. Additional description related to the micro-LED array provided below. The light source may be positioned near a temple region of the head wearable display, such as shown in FIG. 2A. In some embodiments, the light source may be positioned on other parts of the wearable display.

The waveguide stack 810 of the optical system 800 can include a plurality of waveguides 811 including an in-coupling grating 815 and an out-coupling grating 813. Referring to FIG. 8B, in some embodiments, three or more of the waveguides 811a-c may include an in-coupling grating 815a-c and an out-coupling grating 813a-c. In some embodiments, each of the waveguides 811a-c may further include orthogonal pupil expanders ("OPEs") 814a-c that are configured to propagate light 833a-c across a waveguide 811a-c and toward a corresponding out-coupling grating 813a-c. As shown in the figure, in-coupling gratings 815a-c may be spatially aligned vertically and horizontally, e.g., overlapping.

In some embodiments, each of the in-coupling gratings 815a-c can selectively diffract light 833a-c of a particular wavelength into a corresponding waveguide 811a-c. For example, each image light 833a-c may correspond to a different wavelength, e.g., light 833a may correspond to a red wavelength, light 833b may correspond to a green wavelength, and light 833c may correspond to a blue wavelength. In turn, in-coupling grating 815a may be sensitive to the red wavelength of light 833a, in-coupling grating 815b may be sensitive to the green wavelength of light 833b, and in-coupling grating 815c may be sensitive to the blue wavelength of light 833c. For example, light 833a may correspond to a red light wavelength, and in-coupling grating 815a may be configured to selectively diffract light 833a that corresponds to the red light wavelength. When the in-coupling grating 815a receives light 833b or 833c, said light may pass through the in-coupling grating 815a without being diffracted into the waveguide 811a. This described configuration is exemplary and a skilled artisan will recognize that any of the in-coupling gratings may correspond to any suitable wavelength. The OPE 814 can propagate the in-coupled light 835 in the horizontal direction by total internal reflection (TIR) to an out-coupling grating 813, where the in-coupled light 835 can be directed out of the waveguide stack 810 and toward an eye 820 of a user. In addition to selective color in-coupling gratings, the waveguides 811 can be formed to absorb colors that are not desired in that particular waveguide to further limit color crosstalk.

Compared to the in-coupling gratings 715a-c illustrated in FIG. 7, the in-coupling gratings 815 may be arranged to be spatially overlapping, e.g., aligned. In some cases, when the in-coupling gratings overlap, the size of the projector and overall optical system can be reduced. Further, a single pupil light source may allow for simpler and cheaper alignment and test equipment.

The optical system 800 may work in a manner similar to that described above with respect to optical system 700. Referring to FIG. 8C, the light source 801 may be disposed on the first face 823 of the waveguide stack 810. The light source 801 may be configured to direct light 830 through the waveguide stack 810 and toward the lens assembly 803 and image generator 805. The light source 801 and the image generator 805 may be configured to be off-axis, e.g., such that the axes of the light source 801 and the image generator 805 are not aligned. Light 830 passes through the lens assembly 803 such that the image generator 805 receives the light 830 generated by the light source 801. The lens assembly 803 can be configured to direct the light 830 to the image generator 805. In some embodiments, the light generator 805 may be disposed on a back face of the lens assembly 803. In some embodiments, an MSP 807 may be located between the lens assembly 803 and the image generator 805. Thus, the light 830 may pass through the MSP 807 before entering the image generator 805. In some embodiments, the MSP 807 may be tilted to minimize the effect of reflections in the system on the image presented to the user.

The image generator 805 can reflect the incoming light 830 to generate image light 833. The image light 833 may pass through the MSP 807 upon exiting the image generator 805. The image light 833 may then enter the lens assembly 803, where light 833 can be directed towards the waveguide stack 810. Upon reaching the second face 827 of the waveguide stack 810, the image light 833 can pass through a circular polarizer 817 before entering the second face 827 of the waveguide stack 810.

The image light 833 received by the waveguide stack 810 may be diffracted by one of the in-coupling gratings 815. For example, if the image light 833 corresponds to a wavelength of the color red, the image light 833 may be diffracted by an in-coupling grating 815 configured to diffract light corresponding to the same wavelength. The in-coupled light 835 can then propagate along the waveguide 811 via TIR. The in-coupled light 835 may exit the waveguide 811 via out-coupling grating 813 and be presented to an eye 820 of the user. In some embodiments, an OPE may be included in the waveguide stack 810 as described with respect to FIG. 8B.

As discussed above with respect to optical system 700, optical system 800 can provide a relatively compact configuration that provides a uniform image with high throughput, e.g., efficiency. For example, because the light source 801 as shown is off-axis from the image generator 805, the lens assembly 803 can be used to direct light to the image generator 805. As illustrated, the image generator 805 can be disposed at the back of the lens assembly 803, which reduces the overall depth of the optical system 800, e.g., compared to optical system 500 and 600. Additionally, the optical system 800 may be more efficient, as less light is lost to various optical components, e.g., prism and partially-transmissive partially-reflective surface. Further, due to the reduced footprint of the light source 801 and the spatially aligned in-coupling gratings 815, the optical system 800 may be smaller than optical system 700.

Figure 9:
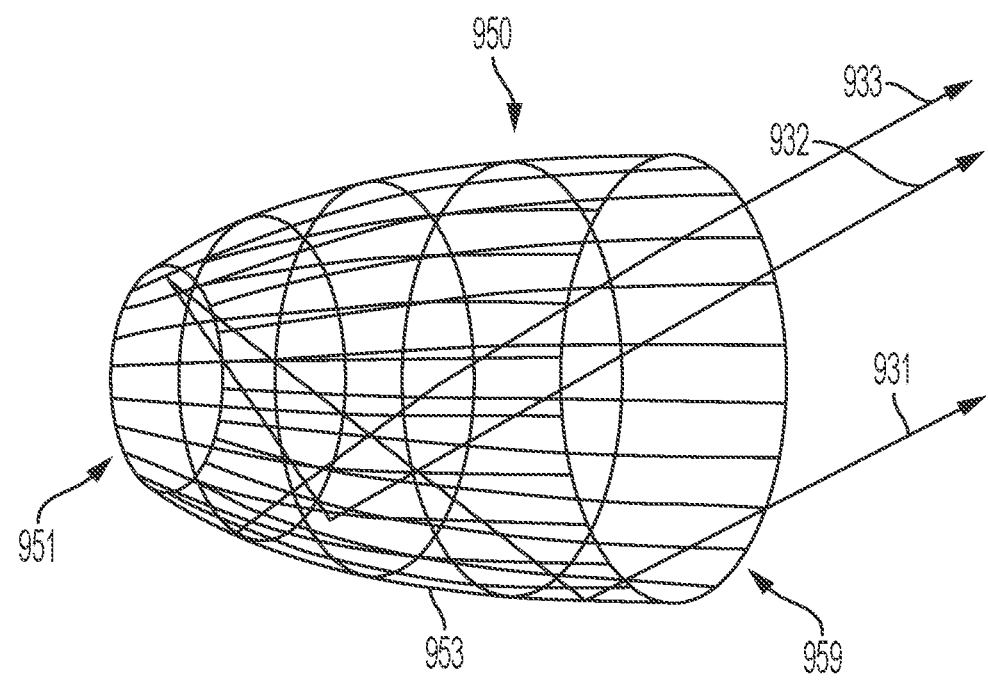
FIG. 9 illustrates an example reflector for an example optical system, according to one or more embodiments of the disclosure.

FIG. 9 illustrates a reflector 950 in accordance with embodiments of this disclosure. The reflector 950 may include a light input opening 951 and a light output opening 959 and sides 953. As shown in the figure, the reflector 950 may have a profile corresponding to a compound parabolic concentrator (CPC). For example, sides 953 of the reflector

950 may correspond to a profile of a CPC reflector. In some embodiments, the light input opening 951 and the light output opening 959 may be circular, elliptical, or rectangular. The light input opening may be configured to receive light (e.g., light rays 931, 932, 933) from a light emitter (not shown). The light can reflect off the sides 953 of the reflector to exit the reflector 950 through the light output opening 959. In this manner, the reflector 950 collects the edge rays. The spatial uniformity of the outputted light may be designed so the distribution of the light across the image generator is optimal for image quality. It is desirable for a reflector to exhibit improved spatial uniformity. In this manner, the CPC may be designed to control the size of the illumination and the angular distribution of the light while increasing the efficiency of the system.

Figure 10:
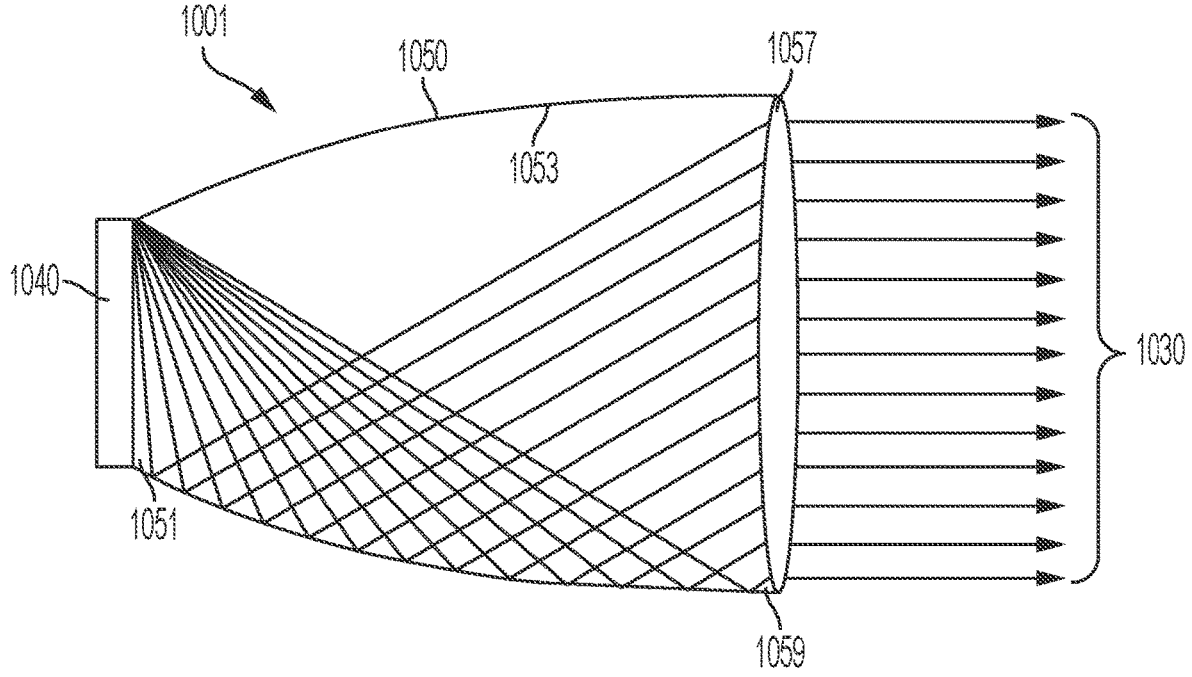
FIG. 10 illustrates an example light source for an example optical system, according to one or more embodiments of the disclosure.

FIG. 10 illustrates a light source 1001 in accordance with embodiments of this disclosure. The light source 1001 can be a single pupil RGB light source (which may correspond to light source 801). As shown in this figure, a light source 1001 may include a reflector 1050 and a micro-LED array 1040.

The reflector 1050 may have a CPC profile, such as discussed with respect to reflector 950 in FIG. 9. In some embodiments, the sides 1053 may have the profile of an ellipse, hyperbola, or biconic shape. The profile of the sides 1053 may be configured to provide an angularly controlled light output at an exit of the reflector 1050.

In some embodiments, a micro-LED array 1040 may be positioned across the light input opening 1051. Although illustrated with the micro-LED array 1040 outside the reflector 1050, a skilled artisan will understand that the micro-LED array may be positioned inside the reflector 1040 at the light input opening 1051. As described above, light generated by the micro-LED array 1040 may include light in the three primary colors, namely blue (B), green (G), and red (R). In other words, the micro-LED array 1040 can be an RGB micro-LED array that includes a plurality of red, green, and blue LEDs (not individually shown). Each of the plurality of red, green, and blue LEDs may be arranged to be uniformly distributed across the bottom aperture of the reflector 1050. In some embodiments, if more optical power of a particular wavelength is desired, the number of micro-LEDs corresponding to the desired wavelength may be increased and/or micro-LEDs corresponding to the desired wavelength may be larger than the micro-LEDs corresponding to the other wavelengths.

The substantially uniform distribution of LEDs across the light input opening 1051 may reduce or mitigate the formation of hot spots of light exiting the light source 1001. For example, to achieve a single pupil RGB light source, three LEDs—a red LED, a blue LED, and a green LED—could be placed together in a reflector. This configuration, however, results in substantial non-uniformities of light exiting the light output opening 1059, e.g., hot spots. These hotspots in light leaving the light source 1001, in turn can provide non-uniform lighting across the LCOS, which results in localization of color in the image light. In a wearable head device, the hot spots may present itself to the user as areas on the display oversaturated with a particular color. For example, the display as viewed by the user may have regions that are oversaturated with a blue hue. As another example, if the display were to present the user with a true white image, a first region of the image may appear blue, a second region of the image may appear green, and a third region of the image may appear red. This localization of color viewable on the display can undesirably detract from a user's XR experience. It can be desirable for a display to exhibit greater uniformity of light.

In order to improve the uniformity of light, the light source could include a diffuser to increase the spread of light, e.g., etendue, exiting the light source. A diffuser, however, may result in inefficiencies by scattering light from the light source, decreasing the maximum brightness of a display. Due to the substantially uniform distribution of multiple micro-LEDs, the light source 1001 may provide a uniform light output without inefficient diffusers. In this manner, the light source 1001 can provide a small, e.g., single-pupil, package, that is both uniform and efficient. For example, comparing systems 700 and 800 described above, a skilled artisan would understand the three-pupil optical system 700 to likely be larger than the single-pupil optical system 800. Further, as discussed above, including RGB LED emitters in a single reflector results in a relatively large, inefficient reflector that provides non-uniform light. In comparison, optical system 800 can provide an efficient and uniform light source that does not need to rely on diffusers or other techniques that may result in a loss of light, in a small single-pupil package.

Example Micro-LED Arrays

A light source, e.g., light source 801 or 1001, may include a micro-LED array. A micro-LED array can include a plurality of micro-LEDs arranged in a panel. Each micro-LED can form a pixel of the micro-LED array. Micro-LED arrays can have a number of different configurations. For example, when designing a micro-LED array, the size and shape of each micro-LED and pattern or configuration of micro-LEDs in the array can be varied. For example, the micro-LED may have a circular, rectangular, hexagonal, or radial shape, or any other suitable shape. Further, the micro-LEDs can be arranged in various configurations, including linear, rectilinear or hexagonal arrays.

As discussed above, a micro-LED array may be disposed in a reflector, e.g., CPC reflector, to form a light source, e.g., light source 801 or 1001. The shape of the micro-LEDs as well as the relative configuration of the micro-LEDs can impact the irradiance of light that exits the light source, e.g., light 830. This in turn can impact the irradiance of light received at the image generator 805, and ultimately the light presented to a user. The light that exits the light source may correspond to the light, e.g., light 830, that enters the optical system, e.g., optical system 800, via the single pupil of the light source, e.g., light source 801. As discussed above, this light can be reflected by the image generator, e.g., image generator 805, to form image light to be presented to a user. Thus, changing the size, shape, and configuration of the micro-LEDs impacts the irradiance of light exiting pupil of the light source, e.g., light source 801, and in turn, the light presented to a user. Individual micro-LED emitters can have the same size or vary in size. The sizes of the individual micro-LED emitters can range from 1 um to 100 um. The number of micro-LED emitters may be determined by the size of the entrance pupil of the CPC reflector. The entrance pupil size may be related to the exit pupil of the CPC reflector. In some embodiments, the exit pupil size of the CPC reflector may be based on the size and configuration of the optical system, e.g., the exit pupil size may be selected to optimize efficiency and the modulation transfer function (MTF). In some embodiments, the fill factor of the array may be as high as possible to maximize the achievable optical power output.

FIGS. 11A to 18I illustrate examples of various configurations of the micro-LED array in accordance with embodiments of this disclosure. Embodiments of this disclosure are not limited to the micro-LED array configurations that are disclosed herein, rather these examples are merely exemplary of the types of micro-LED array configurations in accordance with embodiments of this disclosure.

Figure 11A:
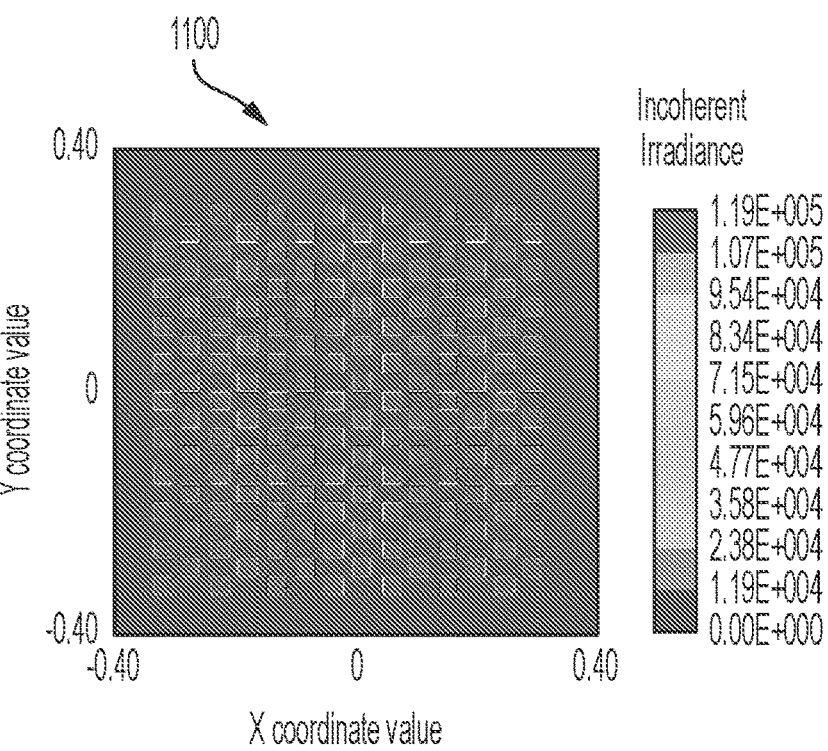
FIGS. 11A-11B illustrate example irradiance of an example micro-LED array for an example optical system, according to one or more embodiments of the disclosure.
Figure 11B:
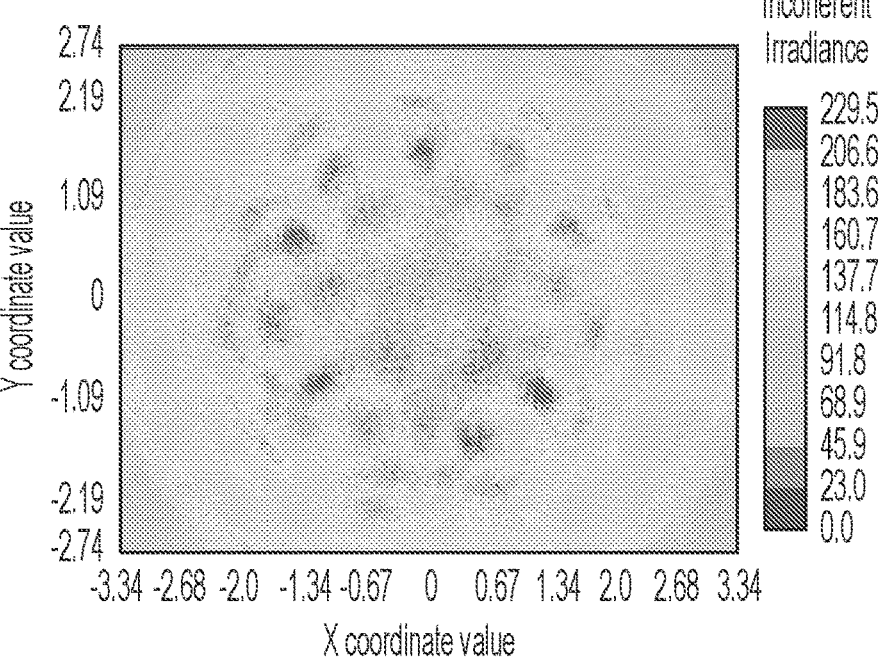

FIG. 11A illustrates a layout of a micro-LED array 1100 in accordance with embodiments of this disclosure. As shown in this figure the micro-LED array 1100 may be rectangular in shape and micro-LED sources may be rectangular in shape with a height and width of about 30 μm. This figure illustrates the micro-LEDs of a single color, but a skilled artisan will understand that the micro-LED array may include additional micro-LED sources corresponding to at least two additional colors. FIG. 11B illustrates a resulting irradiance of image light across, e.g., reflected by, an image generator, based on a configuration of optical system 800 including the micro-LED array 1100.

Figure 12A:
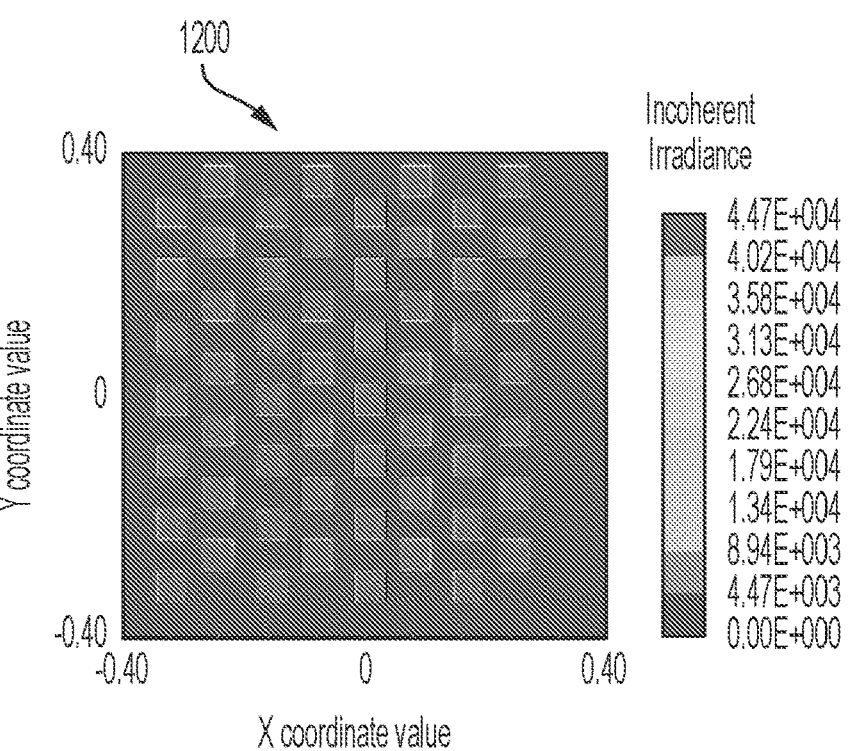
FIGS. 12A-12B illustrate example irradiance of an example micro-LED array for an example optical system, according to one or more embodiments of the disclosure.
Figure 12B:
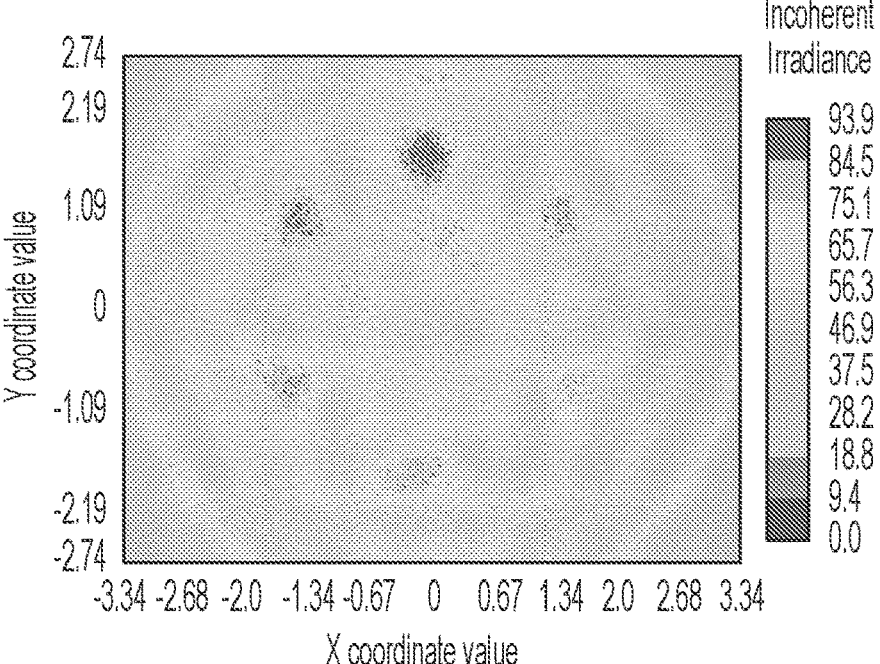

FIG. 12A illustrates a layout of a micro-LED array 1200 in accordance with embodiments of this disclosure. As shown in this figure the micro-LED array 1200 may be rectangular in shape and micro-LEDs may be rectangular in shape with a width of about 50 μm. This figure illustrates the micro-LEDs of a single color, but a skilled artisan will understand that the micro-LED array may include additional micro-LED sources corresponding to at least two additional colors. FIG. 12B illustrates a resulting irradiance of image light across, e.g., reflected by, an image generator, based on a configuration of optical system 800 including the micro-LED array 1200.

Figure 13A:
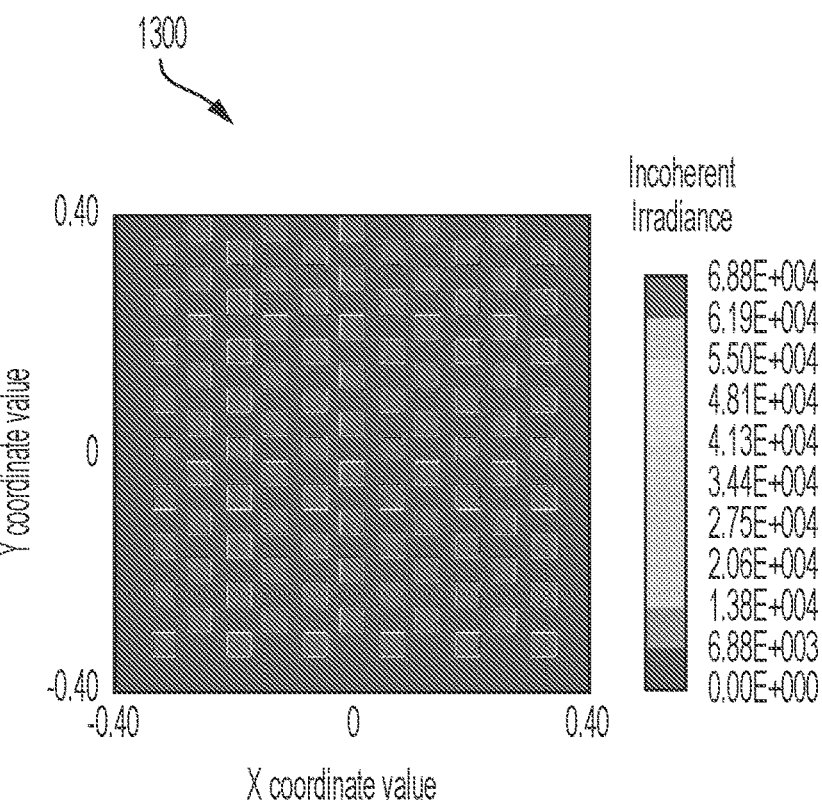
FIGS. 13A-13B illustrate example irradiance of an example micro-LED array for an example optical system, according to one or more embodiments of the disclosure.
Figure 13B:
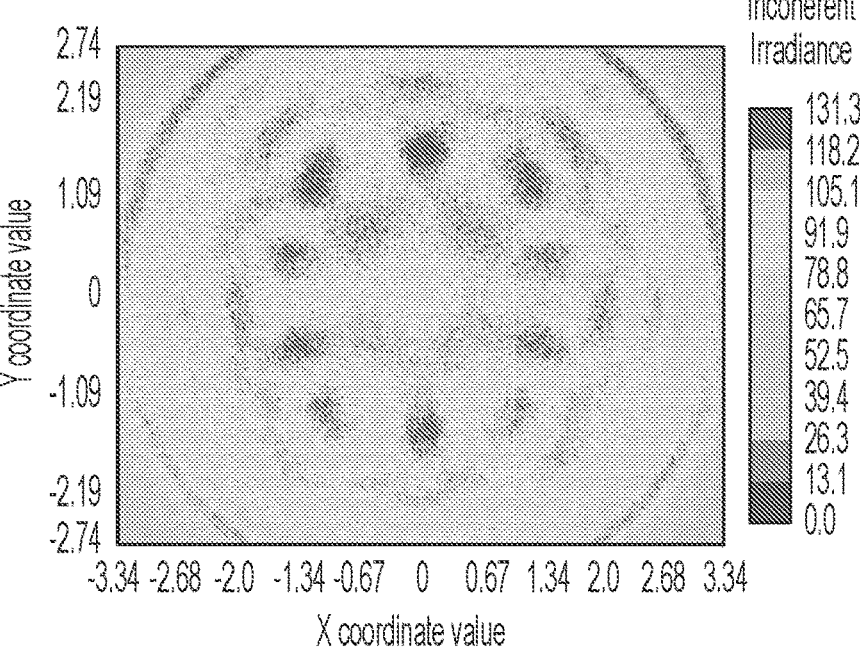

FIG. 13A illustrates a layout of a micro-LED array 1300 in accordance with embodiments of this disclosure. As shown in this figure the micro-LED array 1300 may be rectangular in shape and micro-LEDs may be rectangular in shape with a width and height of about 40 μm. This figure illustrates the micro-LED sources of a single color, but a skilled artisan will understand that the micro-LED array may include additional micro-LED sources corresponding to at least two additional colors. FIG. 13B illustrates a resulting irradiance of image light across, e.g., reflected by, an image generator, based on a configuration of optical system 800 including the micro-LED array 1300.

Figure 14A:
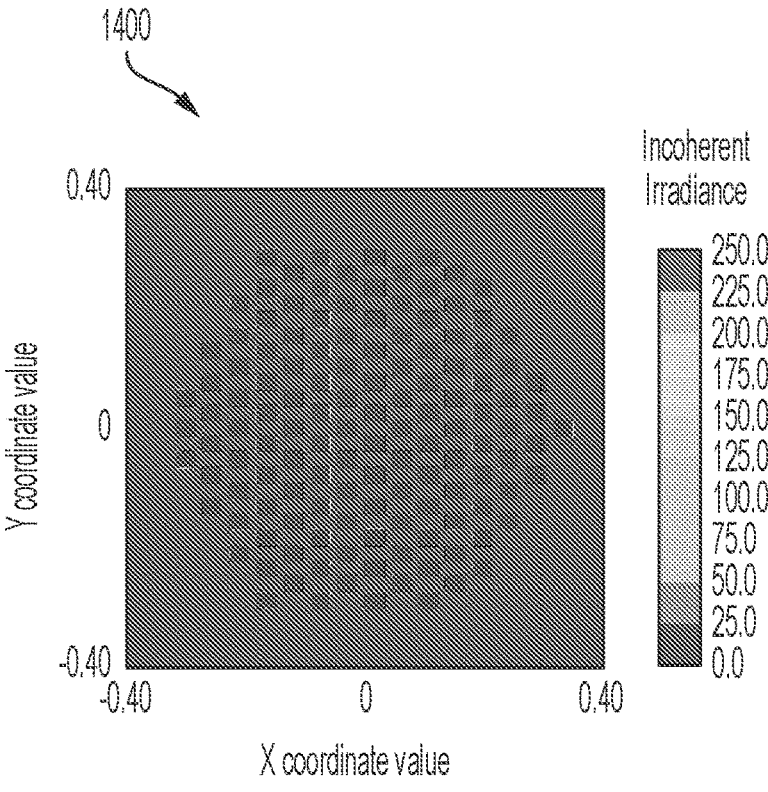
FIGS. 14A-14B illustrate example irradiance of an example micro-LED array for an example optical system, according to one or more embodiments of the disclosure.
Figure 14B:
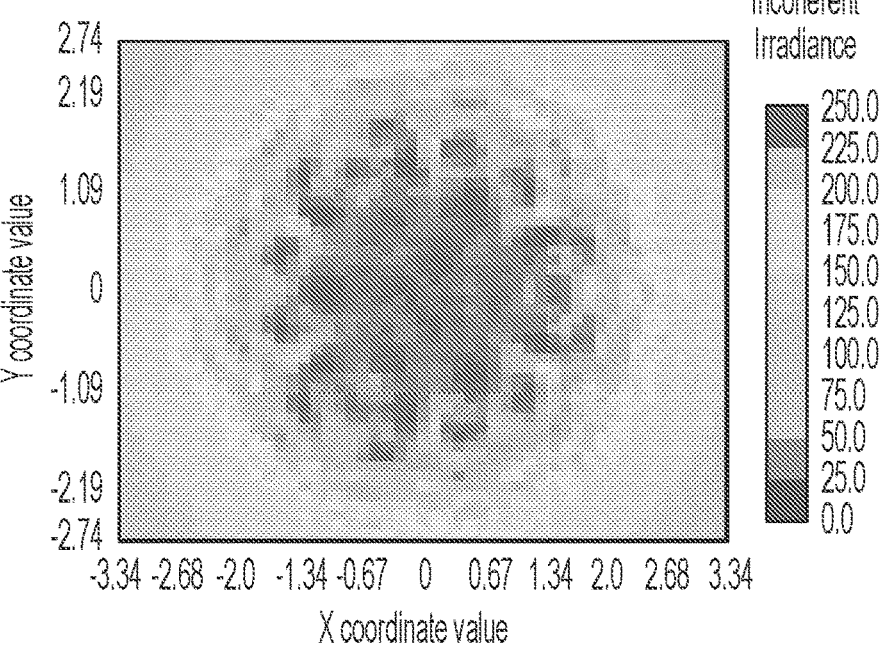

FIG. 14A illustrates a layout of a micro-LED array 1400 in accordance with embodiments of this disclosure. As shown in this figure the micro-LED array 1400 may be hexagonal in shape and micro-LEDs may be rectangular in shape with a width of about 30 μm and a height of about 26 μm, although other sizes, e.g., 25-50 μm may be used. This figure illustrates the micro-LED sources of a single color, but a skilled artisan will understand that the micro-LED array may include additional micro-LED sources corresponding to at least two additional colors. FIG. 14B illustrates a resulting irradiance of image light across, e.g., reflected by, an image generator, based on a configuration of optical system 800 including the micro-LED array 1400.

Figure 15A:
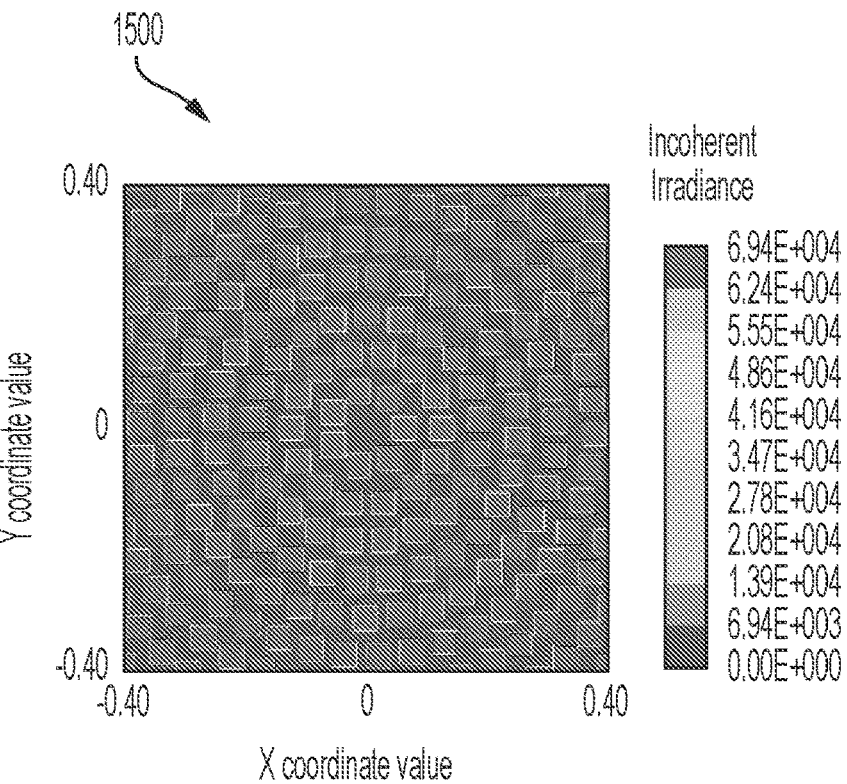
FIGS. 15A-15H illustrate example irradiance of an example micro-LED array for an example optical system, according to one or more embodiments of the disclosure.
Figure 15B:
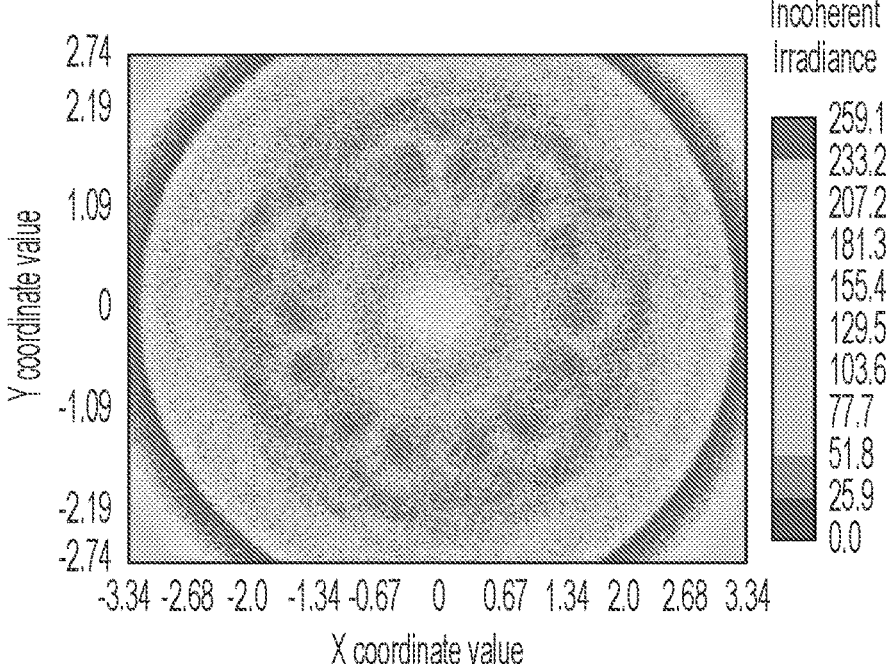
Figure 15C:
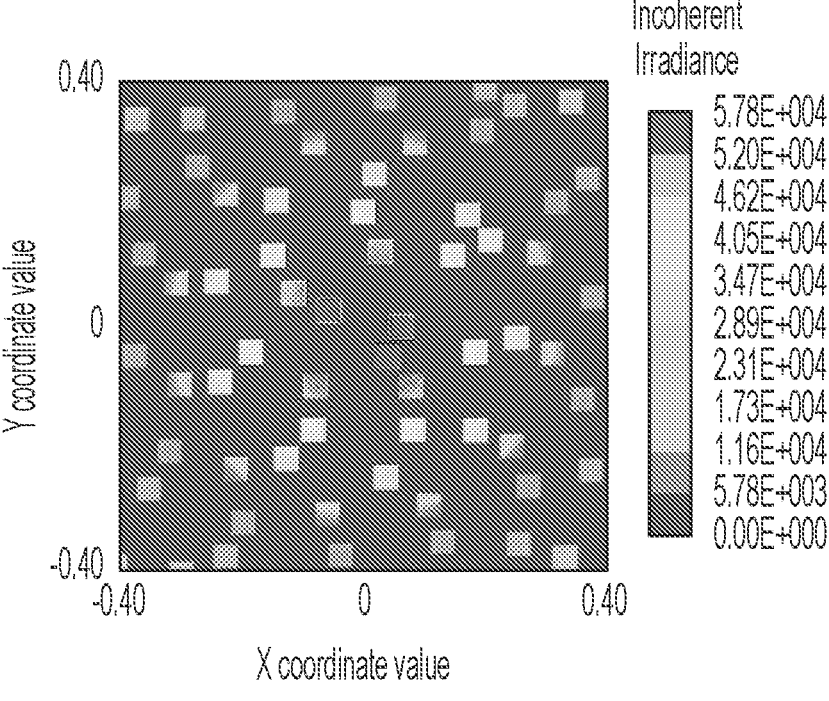
Figure 15D:
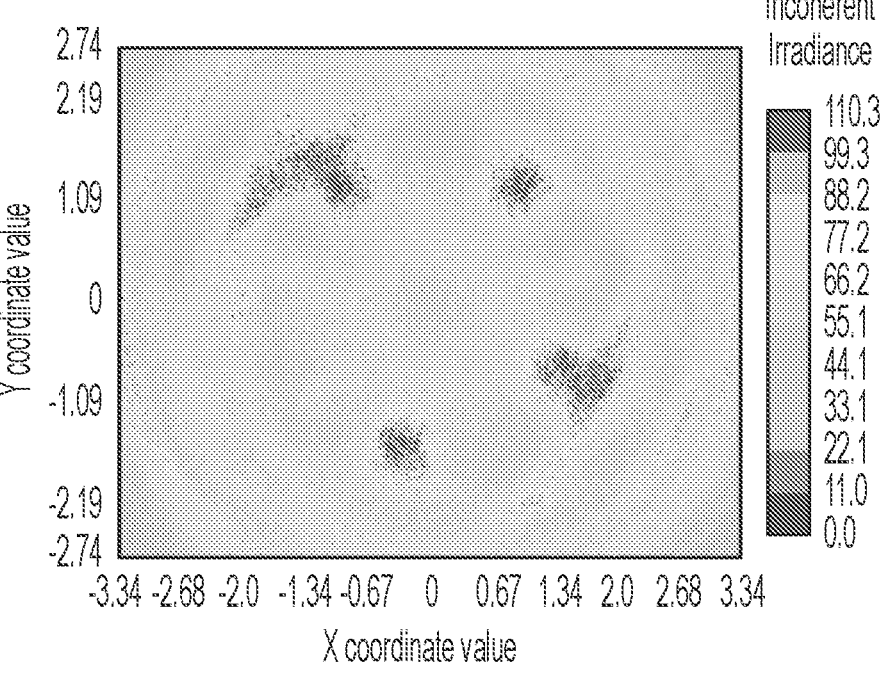
Figure 15E:
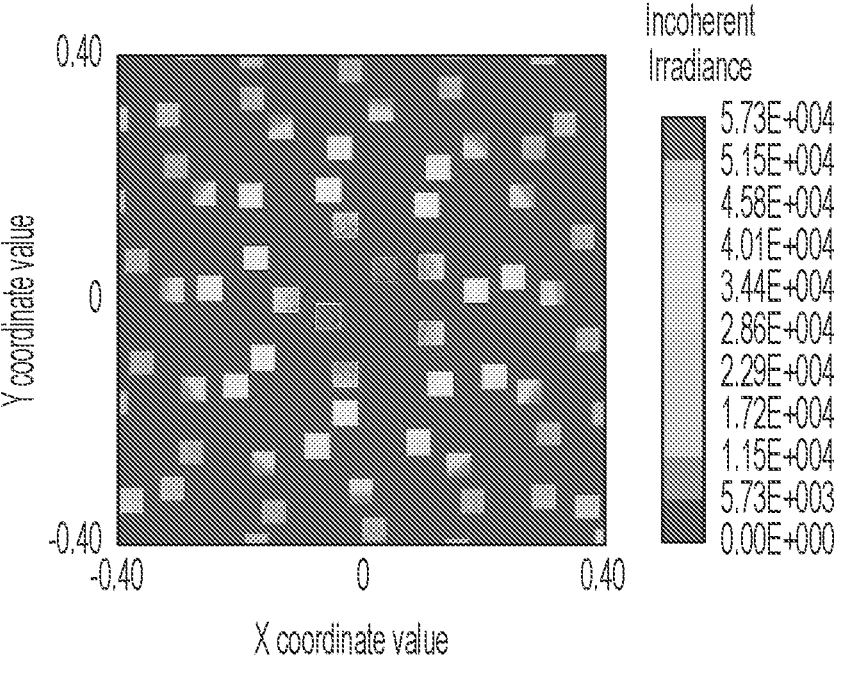
Figure 15F:
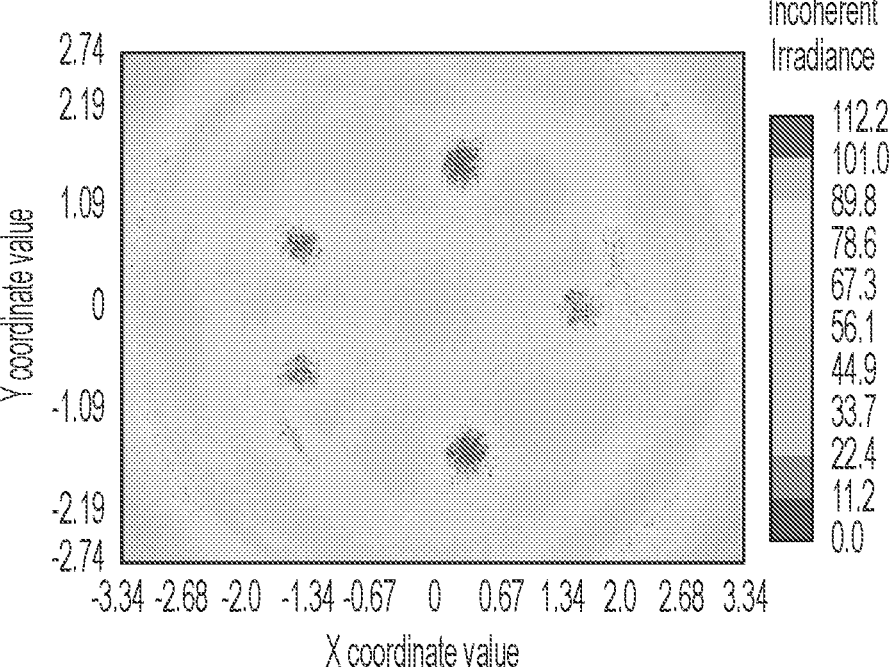
Figure 15G:
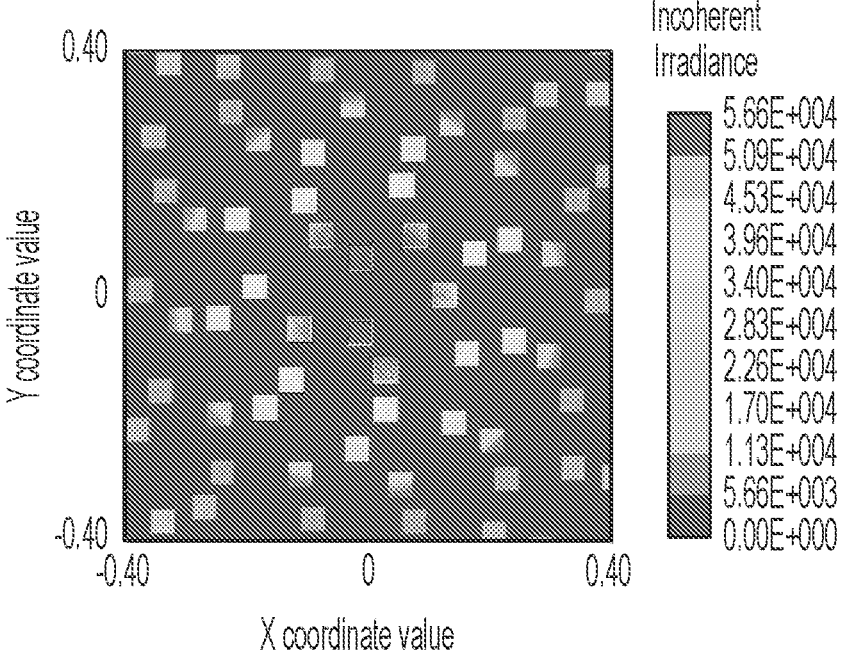
Figure 15H:
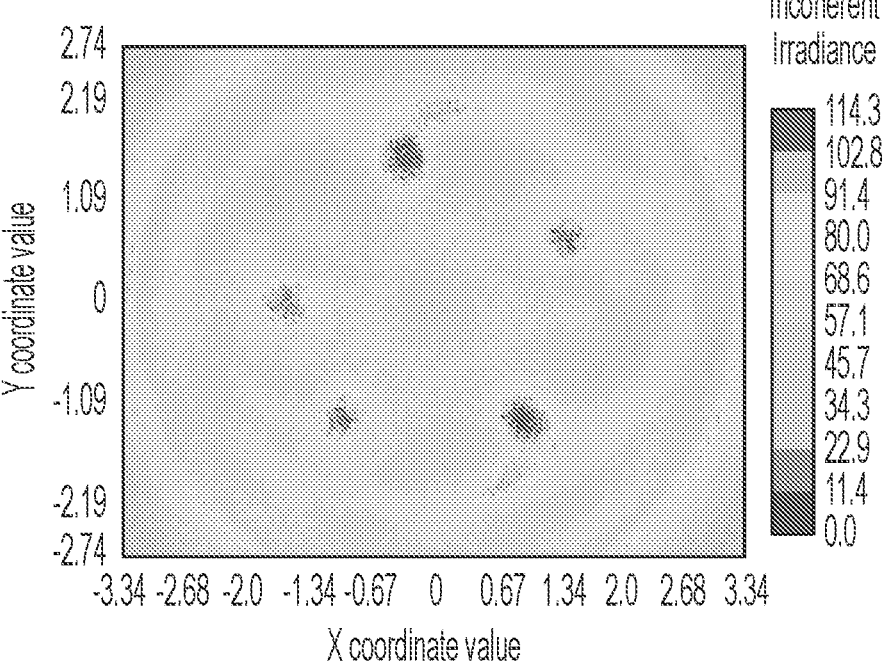

FIG. 15A illustrates a layout of a micro-LED array 1500 in accordance with embodiments of this disclosure. As shown in this figure the micro-LED array 1500 may have a radial configuration and micro-LEDs may be rectangular in shape with a width and height of about 40 μm, although other sizes, e.g., 25-50 μm may be used. This figure illustrates a configuration of the micro-LED sources including three colors. FIG. 15B illustrates a resulting irradiance of image light across, e.g., reflected by, an image generator, based on a configuration of optical system 800 including the micro-LED array 1500. FIG. 15C illustrates a layout of micro-LED array 1500 for a first color of the three colors. The figure illustrates an irradiance of light leaving the exit pupil of a light source, e.g., reflector, for all of the micro-LED sources corresponding to the first color emitting simultaneously. (Unless otherwise noted, it is understood that the initial emitting power and/or irradiance of each of the micro-LED sources may be the same.) FIG. 15D illustrates an irradiance of image light reflected by the image generator of the optical system with the single color shown in FIG. 15C. FIG. 15E illustrates an irradiance of light exiting the pupil of a reflector with the micro-LED array 1500 for a second color of the three colors, e.g., where micro-LED sources corresponding to the second color are emitting simultaneously. FIG. 15F illustrates an irradiance of image light reflected by the image generator of the optical system with the single color shown in FIG. 15E. FIG. 15G illustrates an irradiance of light exiting the pupil of a reflector with the micro-LED array 1500 for a third color of the three colors, e.g., where micro-LED sources corresponding to the third color are emitting simultaneously. FIG. 15H illustrates an irradiance of image light reflected by the image generator of the optical system with the single color shown in FIG. 15G.

Figure 16A:
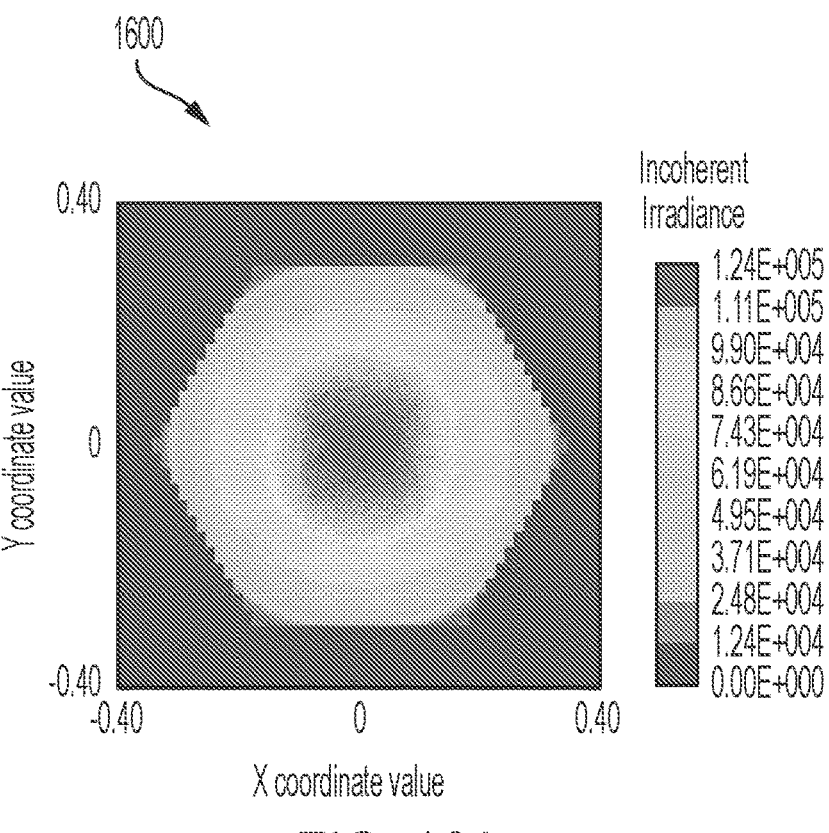
FIGS. 16A-16H illustrate example irradiance of an example micro-LED array for an example optical system, according to one or more embodiments of the disclosure.
Figure 16B:
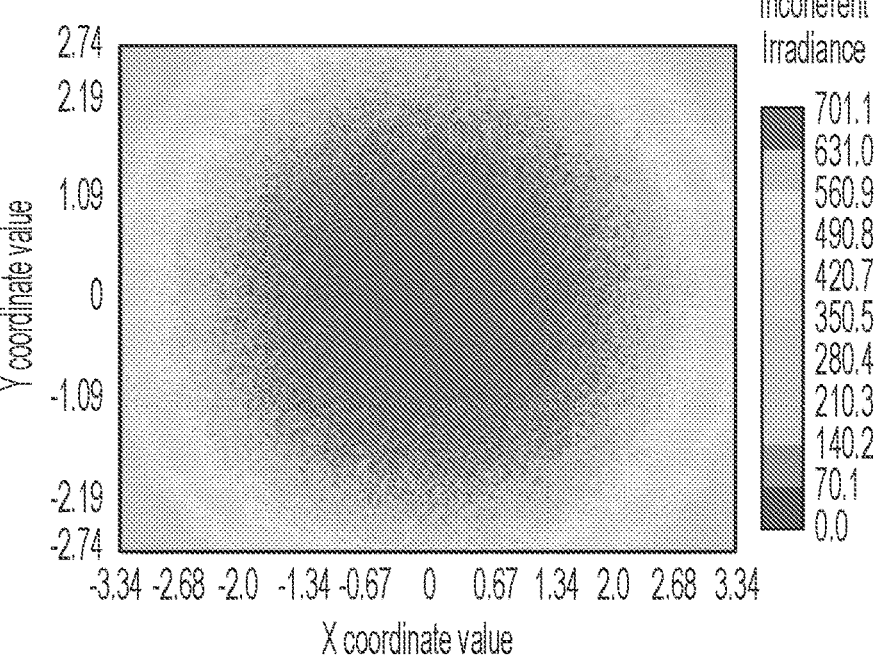
Figure 16C:
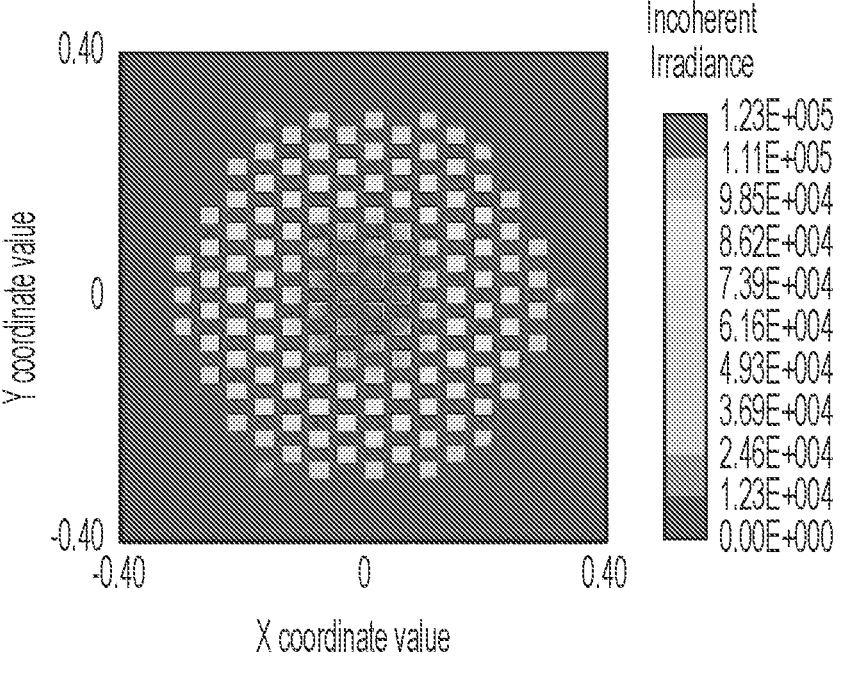
Figure 16D:
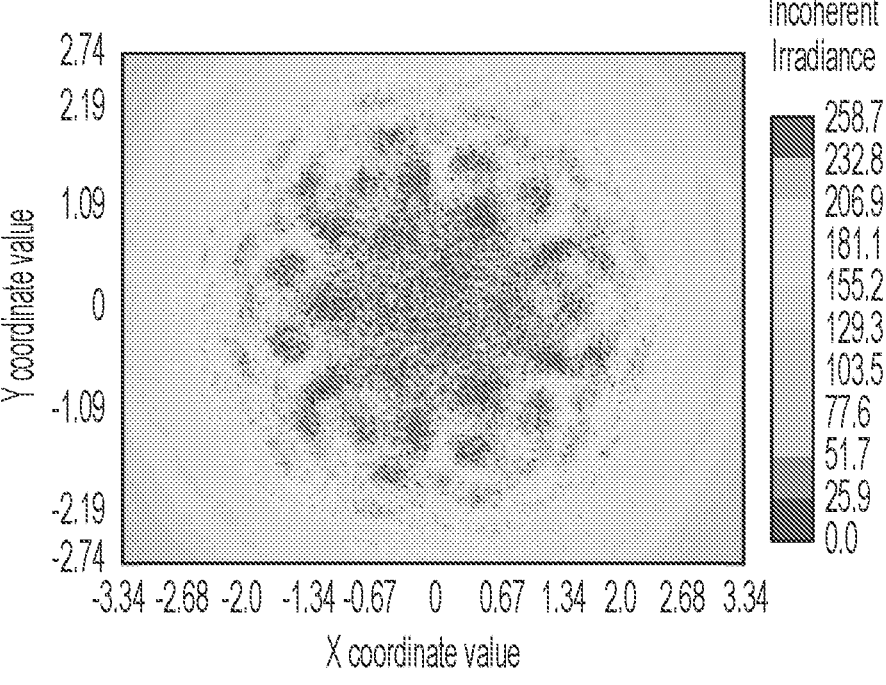
Figure 16E:
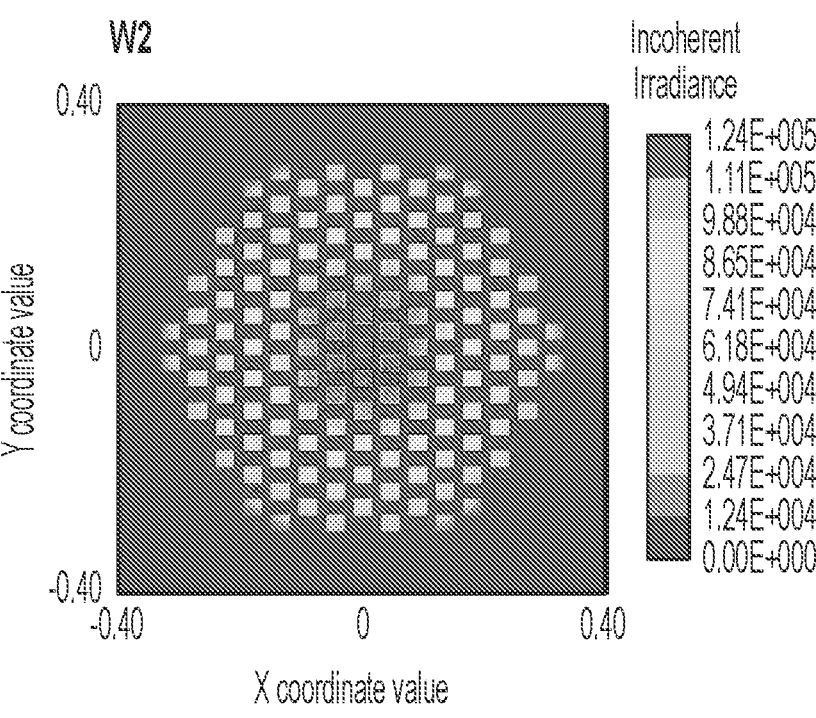
Figure 16F:
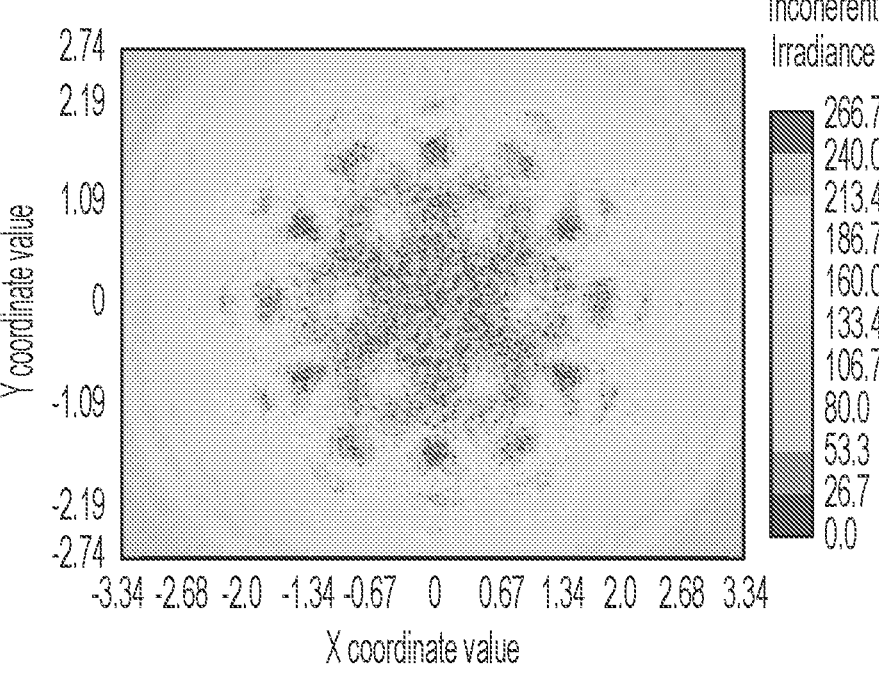
Figure 16G:
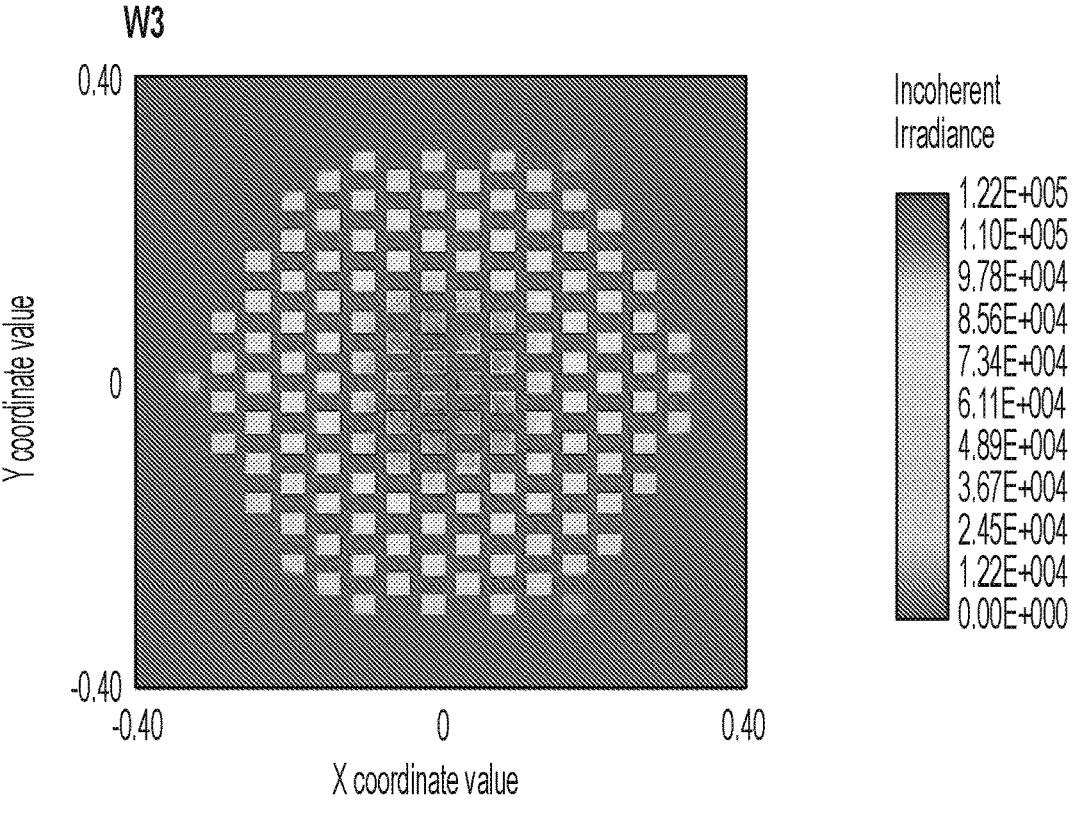
Figure 16H:
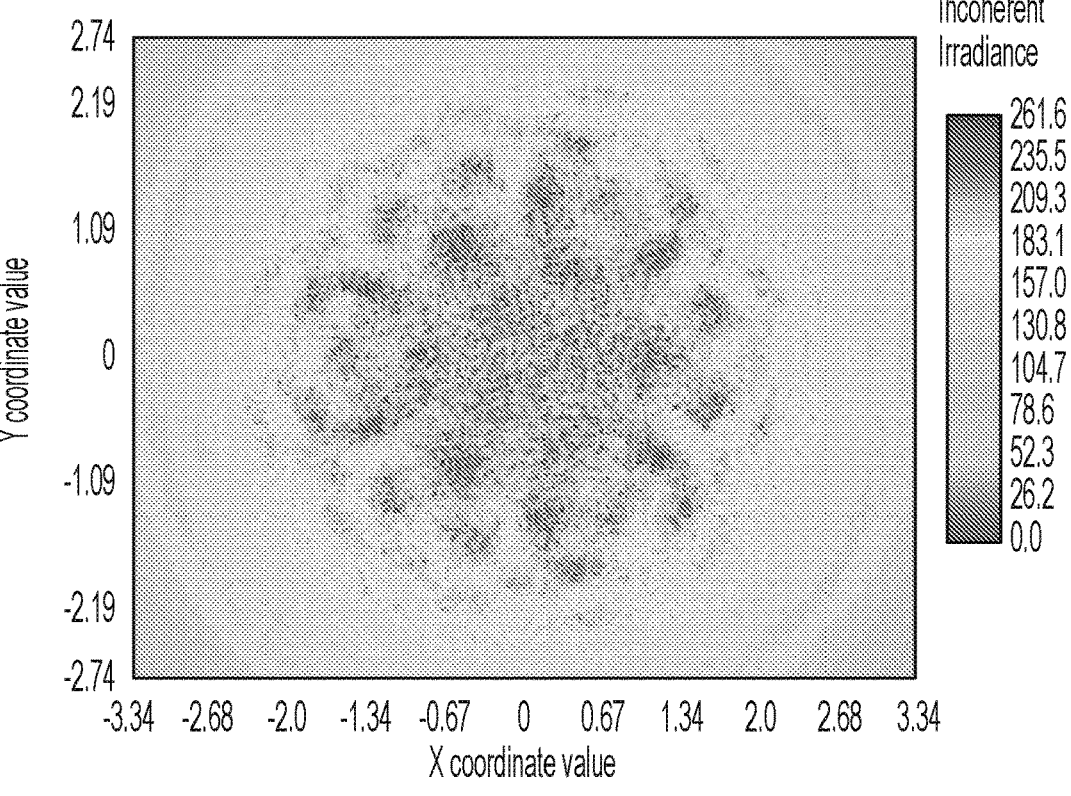

FIG. 16A illustrates a layout of a micro-LED array 1600 in accordance with embodiments of this disclosure. As shown in this figure the micro-LED array 1600 may have a hexagonal configuration and micro-LEDs may be rectangular in shape with a width and height of 25-50 μm. The micro-LED array 1600 may include micro-LED sources corresponding to the primary colors, red, green and blue. This figure illustrates an irradiance of all micro-LED sources in the array 1600, e.g., corresponding to all three colors, measured at the exit pupil of the light source, e.g., reflector. FIG. 16B illustrates an irradiance of image light reflected by the image generator of the optical system with the micro-LED array 1600. FIG. 16C illustrates a layout of micro-LED array 1600 for a first color of the three colors. The figure illustrates an irradiance of light of the micro-LED array. (Unless otherwise noted, it is understood that the initial emitting power and/or irradiance of each of the micro-LED sources may be the same.) FIG. 16D illustrates an irradiance of image light reflected by the image generator of the optical system with the single color shown in FIG. 16C. FIG. 16E illustrates an irradiance of light exiting the pupil of a reflector with the micro-LED array 1600 for a second color of the three colors, e.g., where micro-LED sources corresponding to the second color are emitting simultaneously. FIG. 16F illustrates an irradiance of image light reflected by the image generator of the optical system with the single color shown in FIG. 16E. FIG. 16G illustrates an irradiance of light exiting the pupil of a reflector with the micro-LED array 1600 for a third color of the three colors, e.g., where micro-LED sources corresponding to the third color are emitting simultaneously. FIG. 16H illustrates an irradiance of image light reflected by the image generator of the optical system with the single color shown in FIG. 16G.

Figures 17A, 17B:
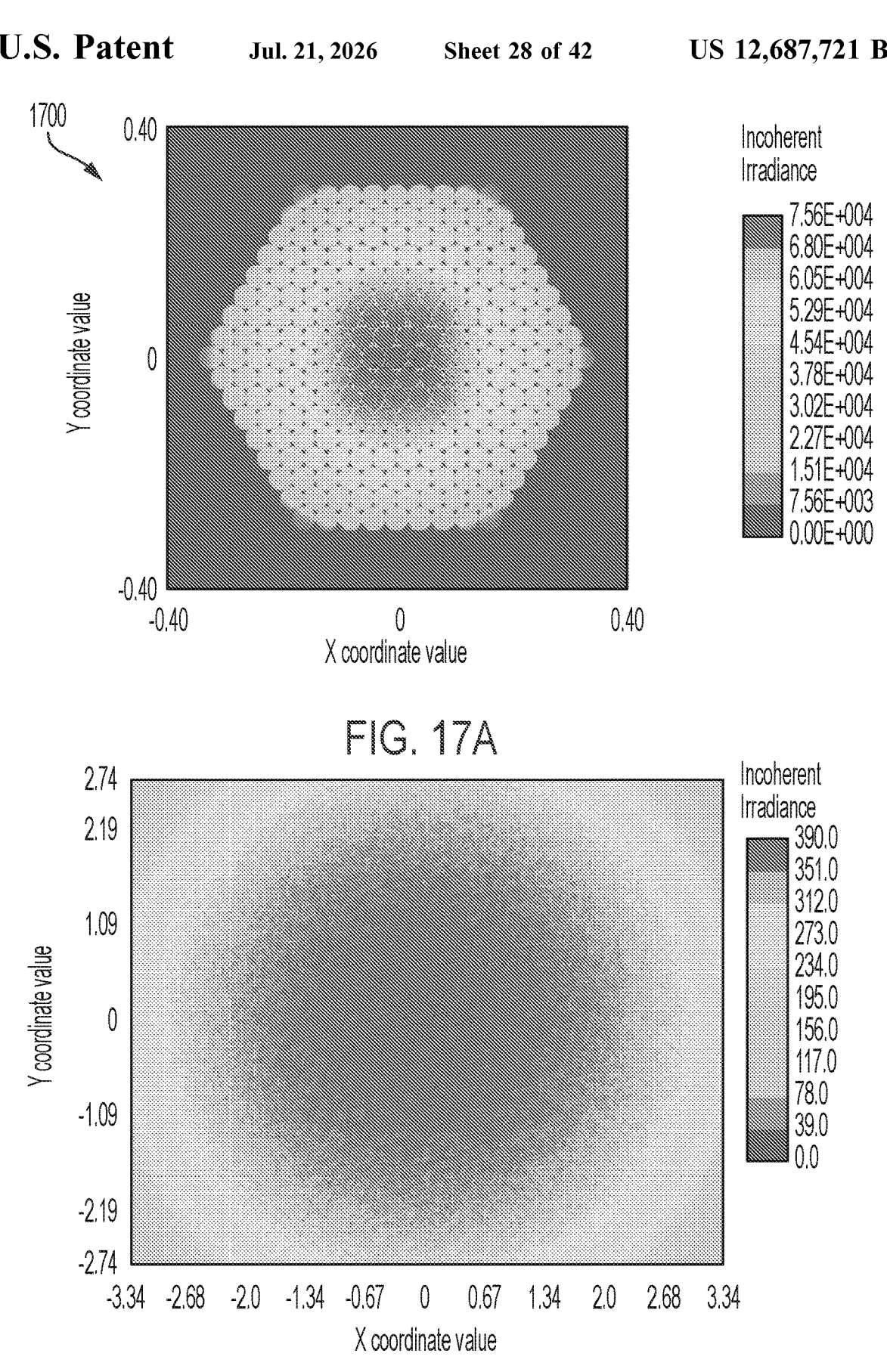
FIGS. 17A-17I illustrate example irradiance of an example micro-LED array for an example optical system, according to one or more embodiments of the disclosure.

FIG. 17A illustrates a layout of a micro-LED array 1700 in accordance with embodiments of this disclosure. As shown in this figure the micro-LED array 1700 may have a hexagonal configuration and micro-LEDs may be circular in shape with a diameter of 25-50 μm. The micro-LED array 1700 may include micro-LED sources corresponding to the primary colors, red, green and blue. This figure illustrates an irradiance of all micro-LED sources in the array 1700, e.g., corresponding to all three colors. In some embodiments all the micro-LEDs in the array may include to micro-LEDs corresponding to three colors, e.g., red, green, and blue. FIG.

Figure 17C:
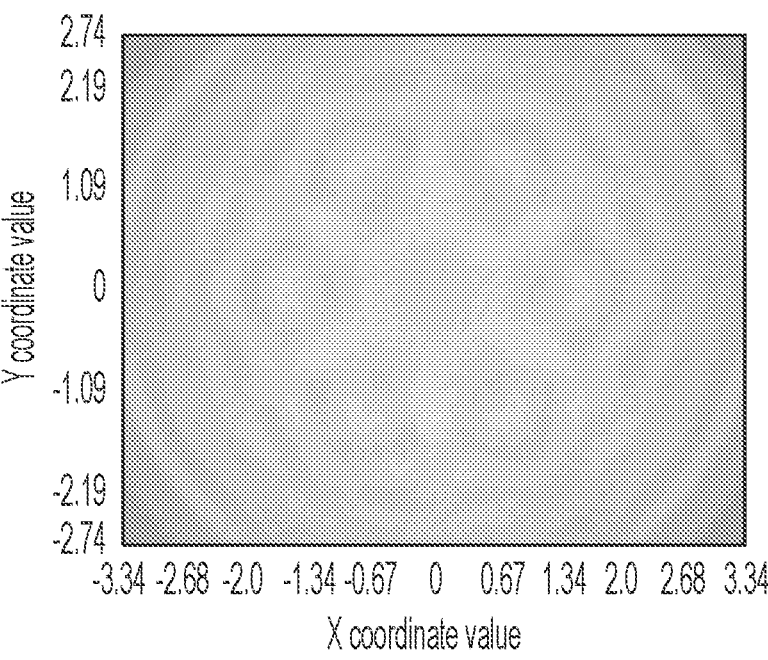
Figure 17D:
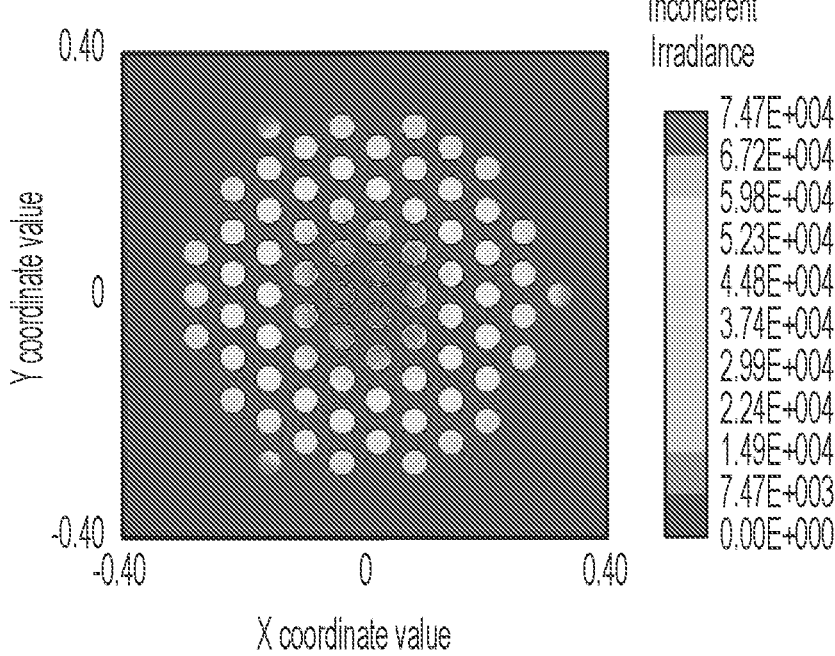
Figure 17E:
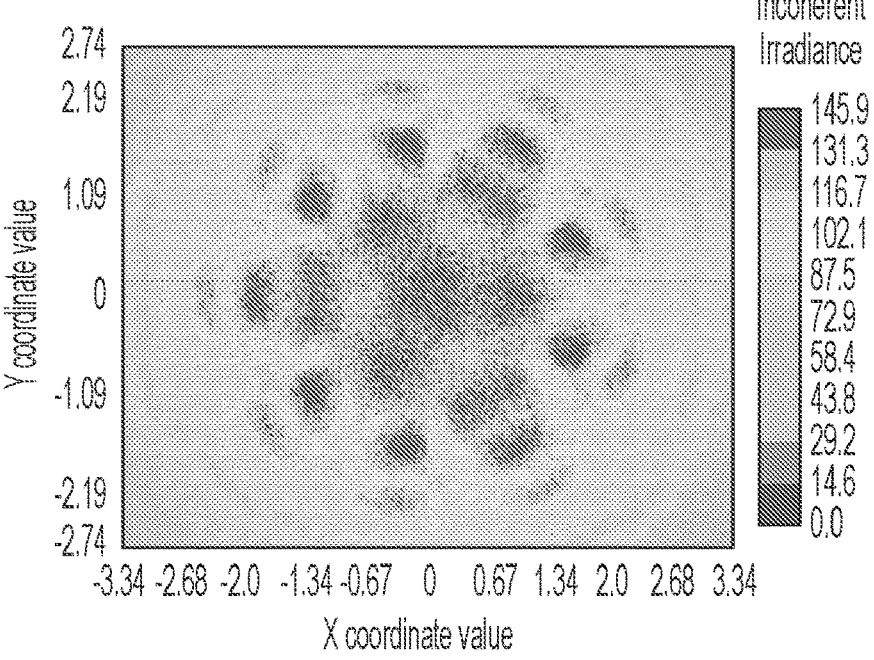
Figure 17F:
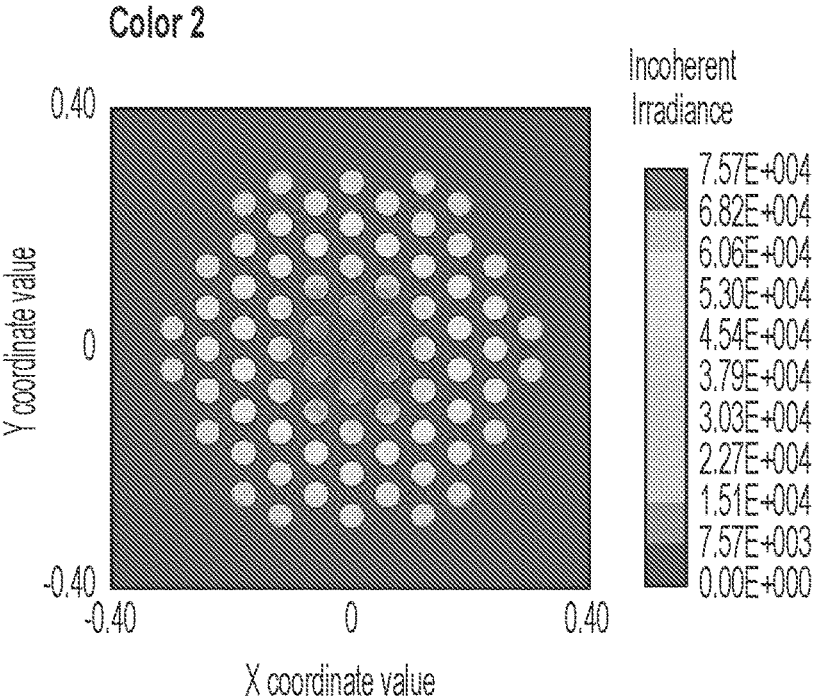
Figure 17G:
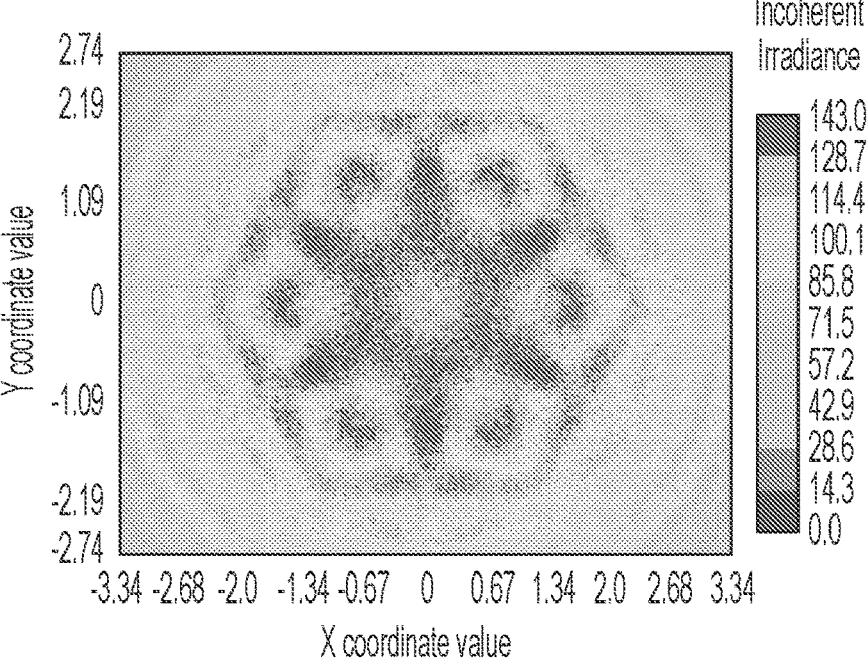
Figure 17H:
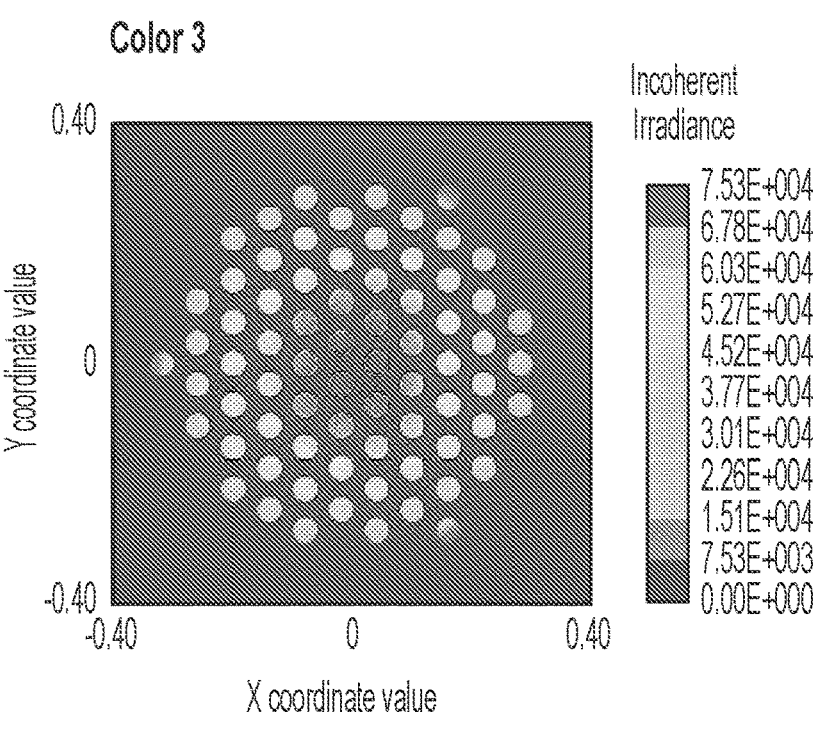
Figure 17I:
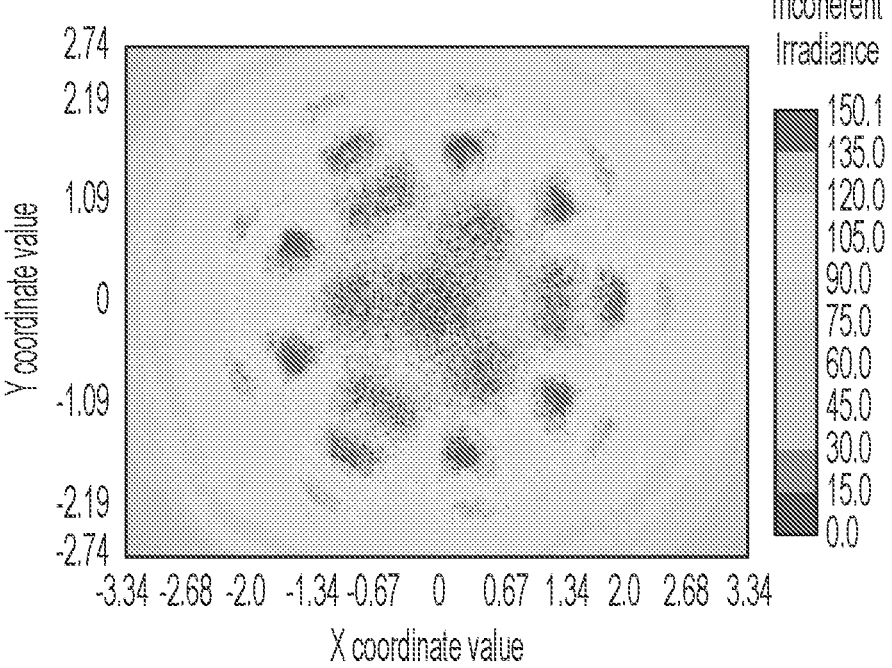

17B illustrates an irradiance of image light reflected by the image generator of the optical system with the micro-LED array 1700. FIG. 17C illustrates an output of a true color detector that receives an output of the image generator when all of the micro-LED sources of micro-LED array 1700 are emitting. FIG. 17D illustrates a layout of micro-LED array 1500 for a first color of the three colors. The figure illustrates an irradiance of light leaving the exit pupil of a light source, e.g., reflector, for all of the micro-LED sources corresponding to the first color emitting simultaneously. (Unless otherwise noted, it is understood that the initial emitting power and/or irradiance of each of the micro-LED sources may be the same.) FIG. 17E illustrates an irradiance of image light reflected by the image generator of the optical system with the single color shown in FIG. 17D. FIG. 17F illustrates an irradiance of light exiting the pupil of a reflector with the micro-LED array 1700 for a second color of the three colors, e.g., where micro-LED sources corresponding to the second color are emitting simultaneously. FIG. 17G illustrates an irradiance of image light reflected by the image generator of the optical system with the single color shown in FIG. 17F. FIG. 17H illustrates an irradiance of light exiting the pupil of a reflector with the micro-LED array 1700 for a third color of the three colors, e.g., where micro-LED sources corresponding to the third color are emitting simultaneously. FIG. 17I illustrates an irradiance of image light reflected by the image generator of the optical system with the single color shown in FIG. 17H.

Figure 18A:
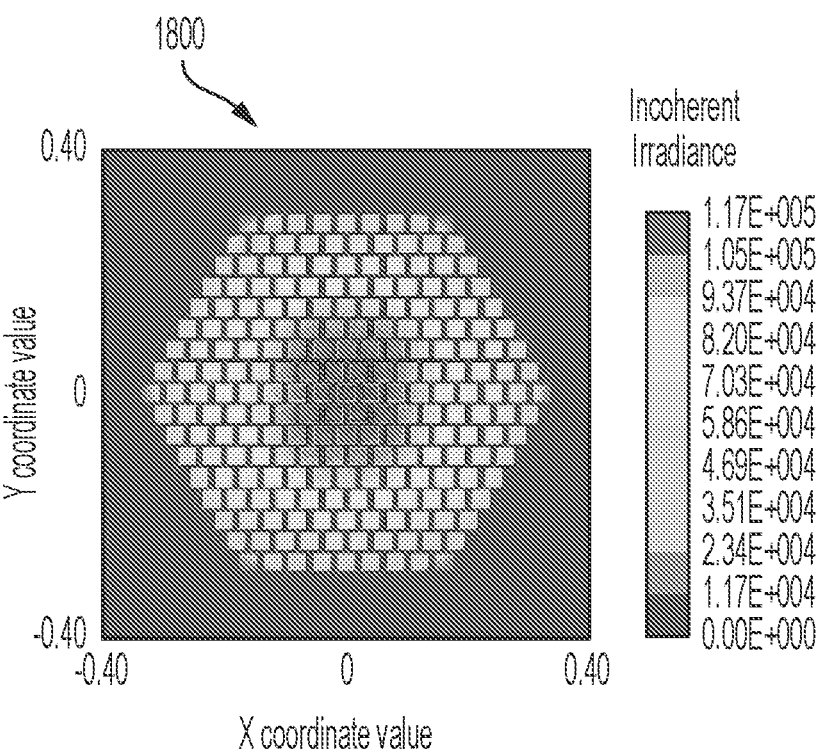
FIGS. 18A-18I illustrate example irradiance of an example micro-LED array for an example optical system, according to one or more embodiments of the disclosure.
Figure 18B:
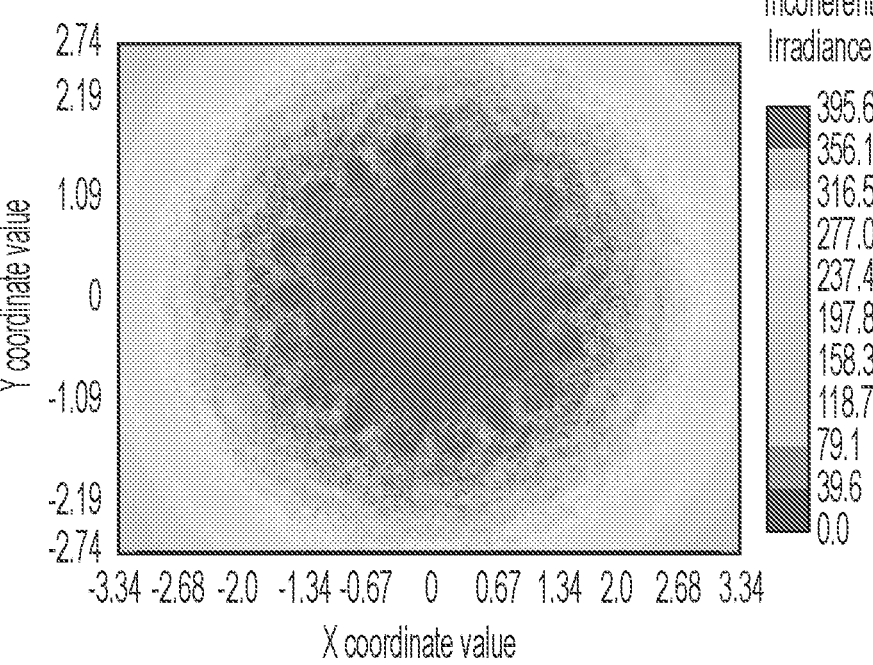
Figure 18C:
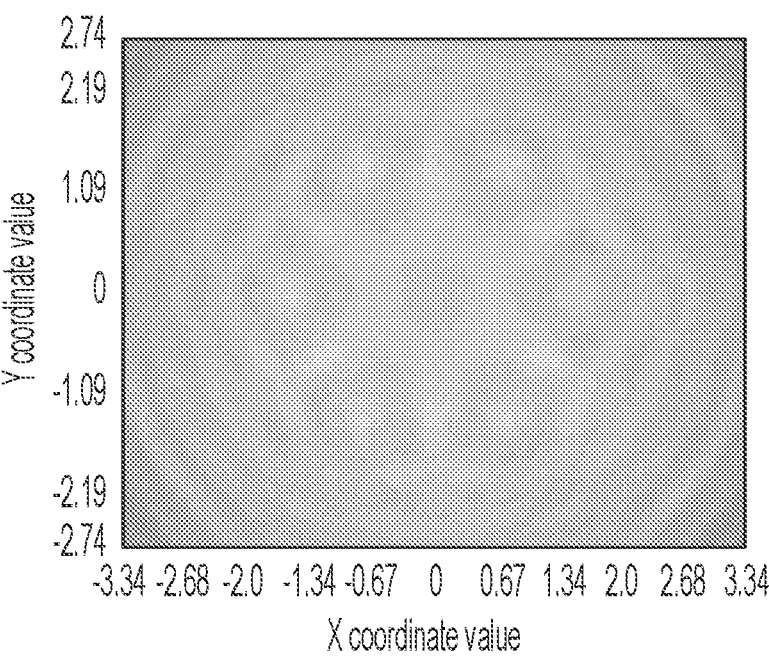
Figure 18D:
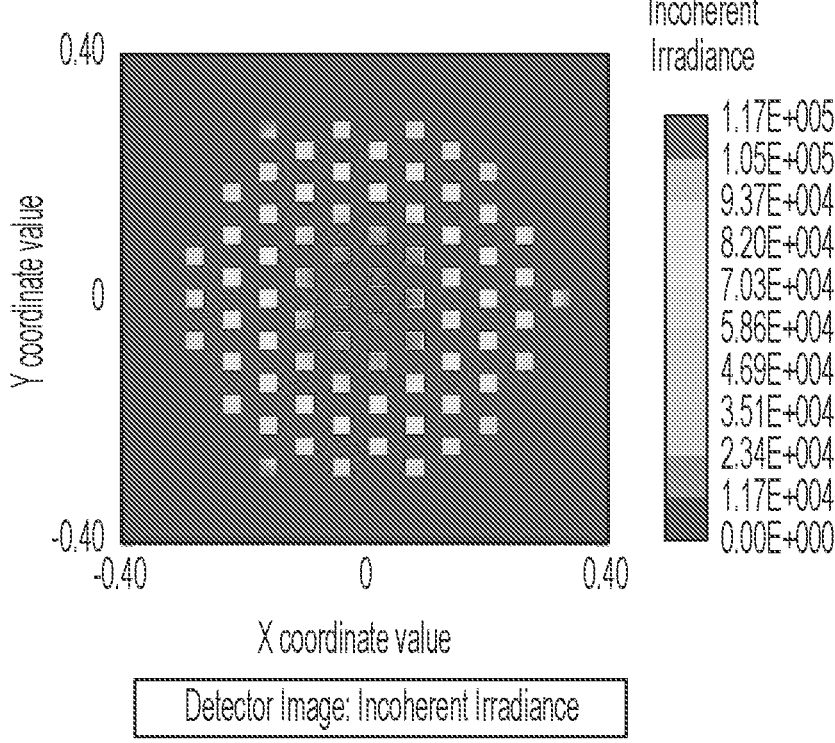
Figure 18E:
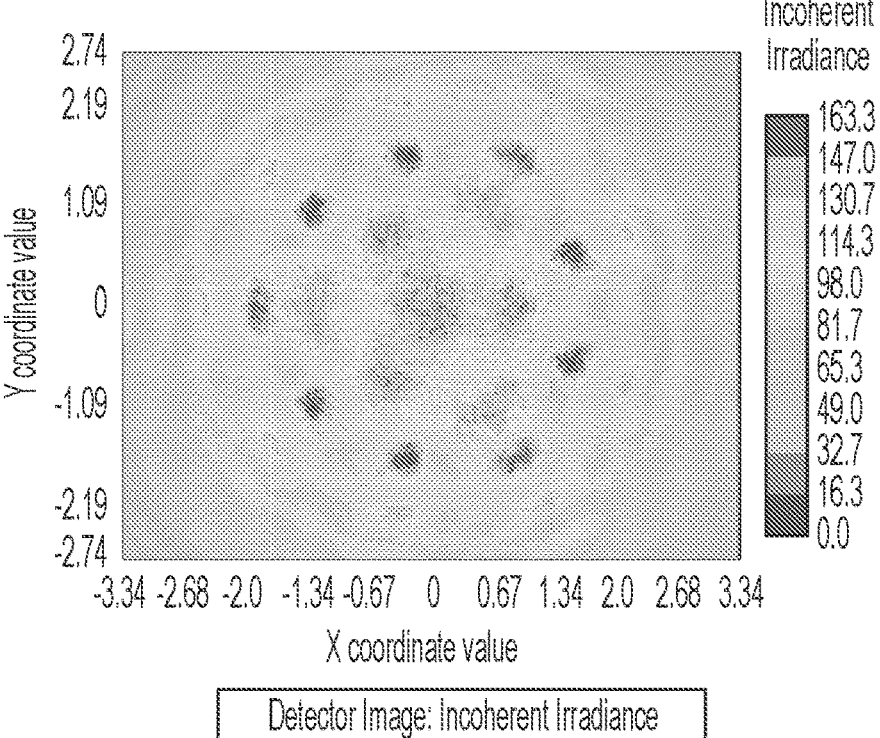
Figure 18F:
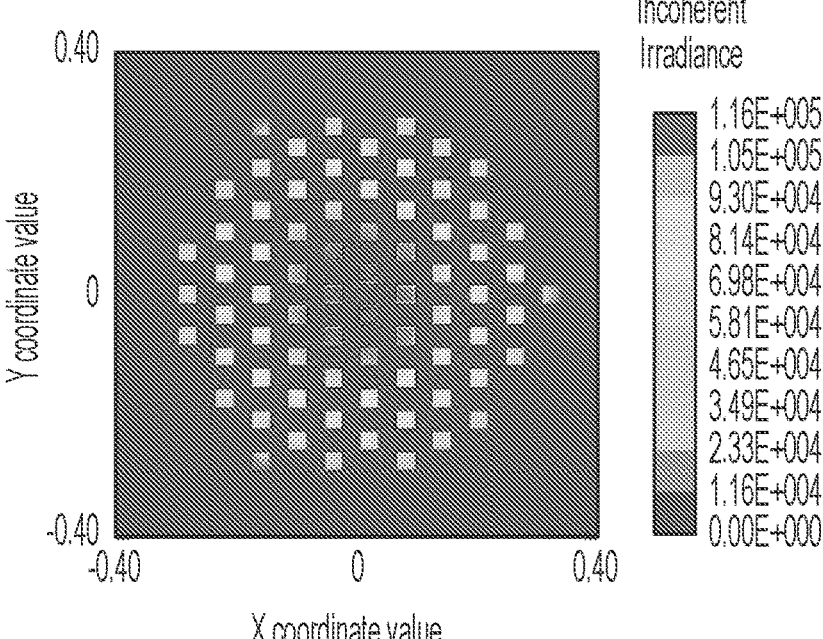
Figure 18G:
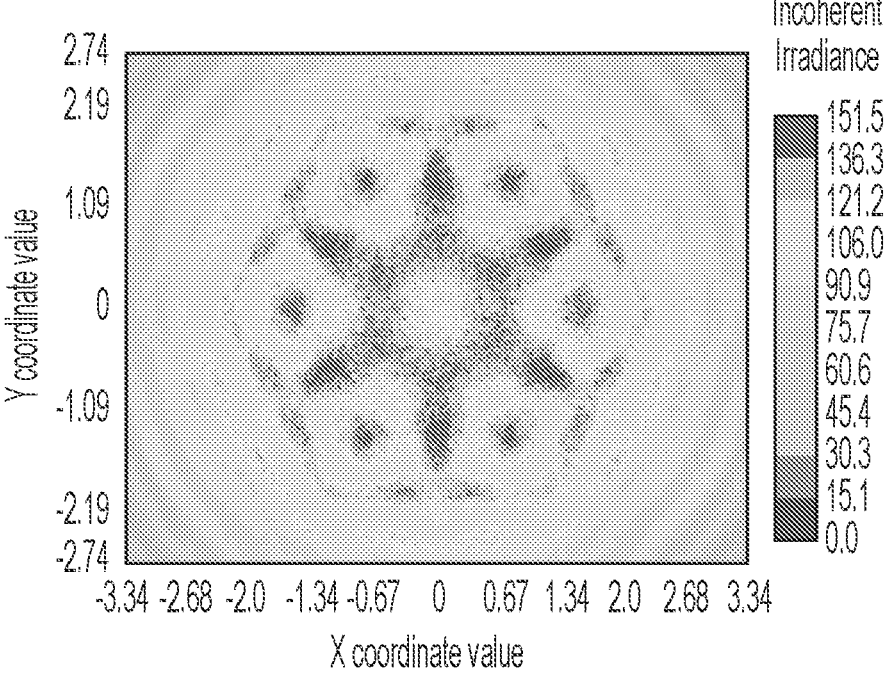
Figure 18H:
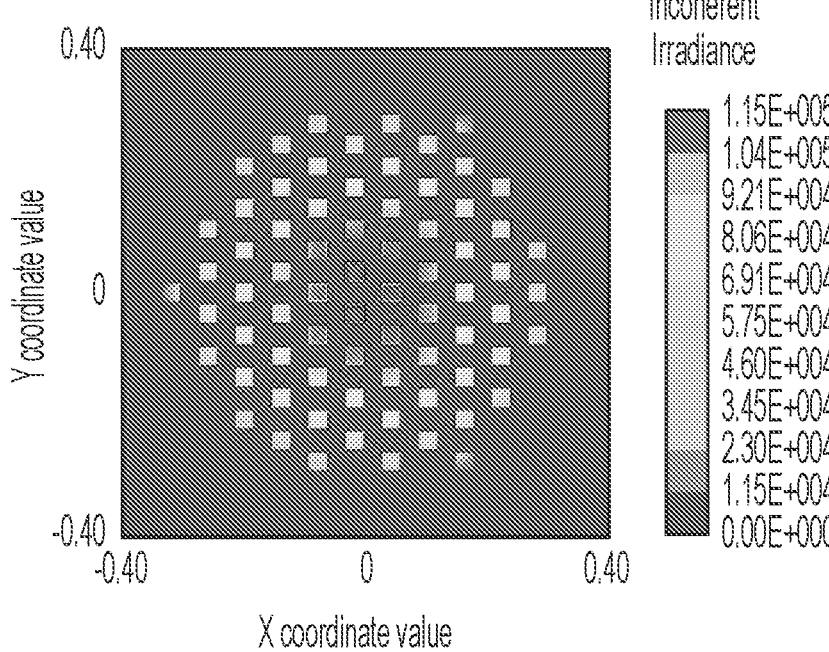
Figure 18I:
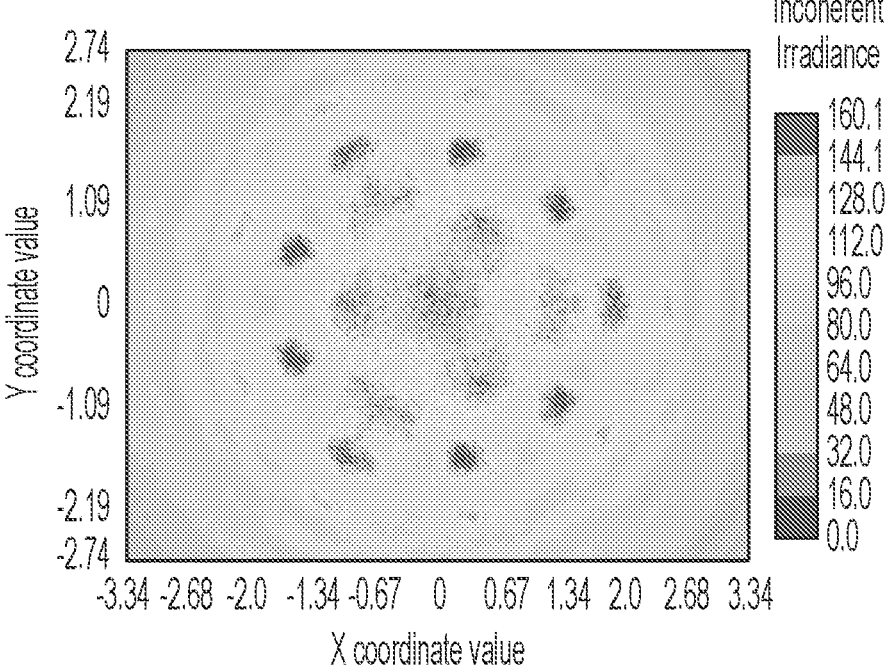

FIG. 18A illustrates a layout of a micro-LED array 1800 in accordance with embodiments of this disclosure. As shown in this figure the micro-LED array 1800 may have a hexagonal configuration and micro-LEDs may be rectangular in shape with a width of 25-50 μm. The micro-LED array 1800 may include micro-LEDs corresponding to the primary colors, red, green and blue. This figure illustrates an irradiance of all of the micro-LEDs in the array 1800, e.g., corresponding to all three colors, measured at the exit pupil of the light source, e.g., reflector. FIG. 18B illustrates an irradiance of image light reflected by the image generator of the optical system with the micro-LED array 1800. FIG. 118D illustrates a layout of micro-LED array 1800 for a first color of the three colors. The figure illustrates an irradiance of light leaving the exit pupil of a light source, e.g., reflector, for all of the micro-LED sources corresponding to the first color emitting simultaneously. (Unless otherwise noted, it is understood that the initial emitting power and/or irradiance of each of the micro-LED sources may be the same.) FIG. 18D illustrates a layout of micro-LED array 1500 for a first color of the three colors. The figure illustrates an irradiance of light leaving the exit pupil of a light source, e.g., reflector, for all of the micro-LED sources corresponding to the first color. (Unless otherwise noted, it is understood that the initial emitting power and/or irradiance of each of the micro-LED sources may be the same.) FIG. 18E illustrates an irradiance of image light reflected by the image generator of the optical system with the single color shown in FIG. 18D. FIG. 18F illustrates an irradiance of light exiting the pupil of a reflector with the micro-LED array 1800 for a second color of the three colors, e.g., where micro-LED sources corresponding to the second color are emitting simultaneously. FIG. 18G illustrates an irradiance of image light reflected by the image generator of the optical system with the single color shown in FIG. 18F. FIG. 18H illustrates an irradiance of light exiting the pupil of a reflector with the micro-LED array 1800 for a third color of the three colors, e.g., where micro-LED sources corresponding to the third color are emitting simultaneously. FIG. 18I illustrates an irradiance of image light reflected by the image generator of the optical system with the single color shown in FIG. 18H.

Figure 19A:
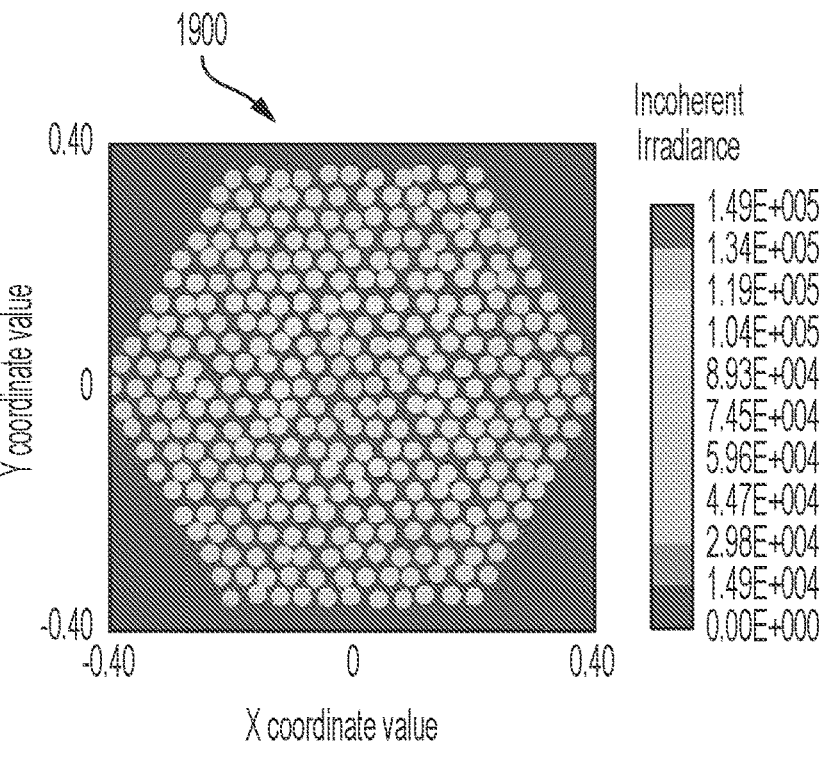
FIGS. 19A-19H illustrate example irradiance of an example micro-LED array for an example optical system, according to one or more embodiments of the disclosure.
Figure 19B:
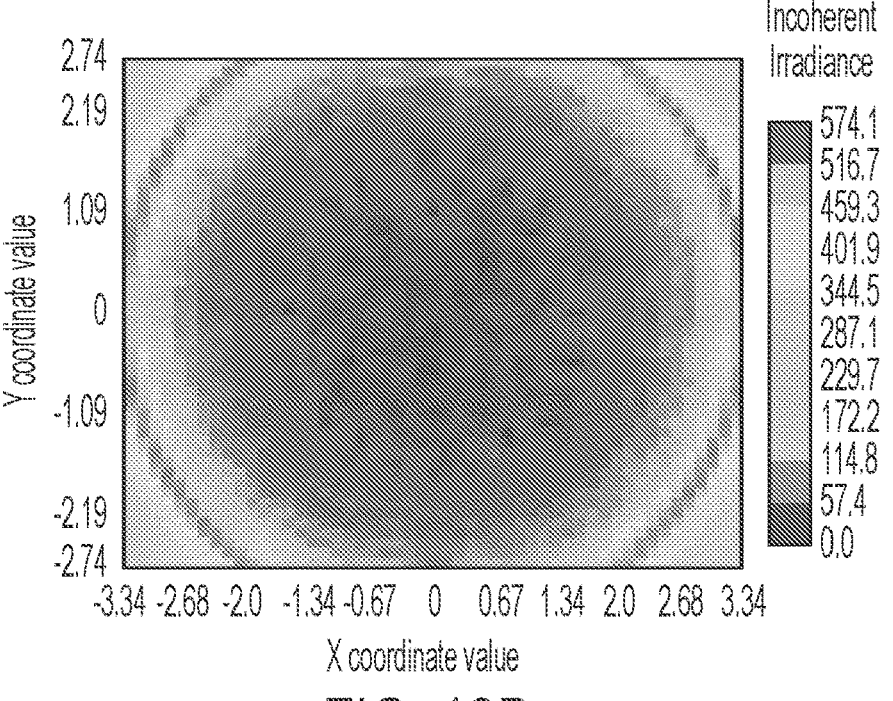
Figure 19C:
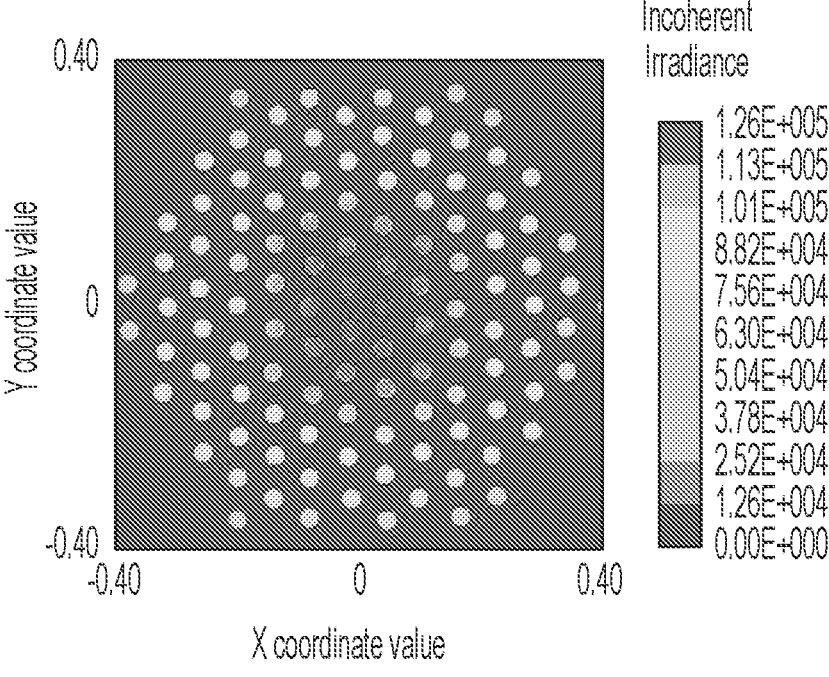
Figure 19D:
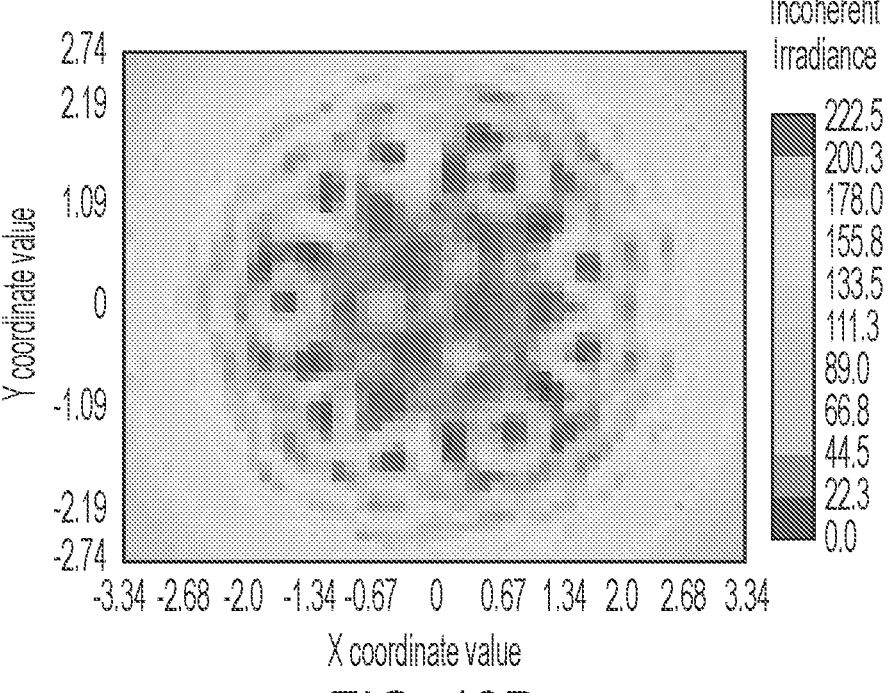
Figure 19E:
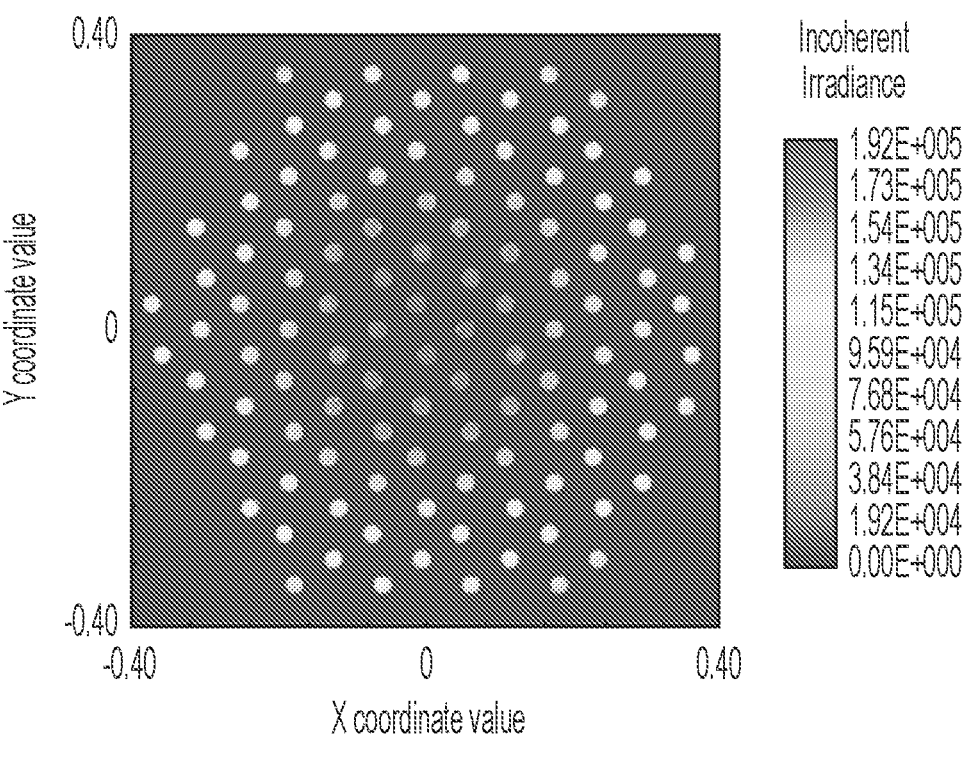
Figure 19F:
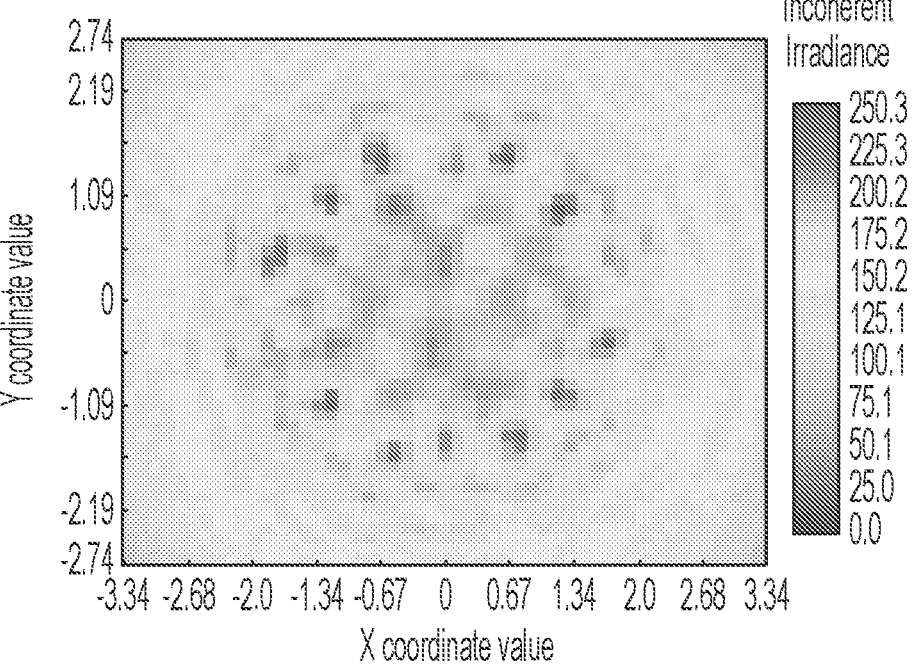
Figure 19G:
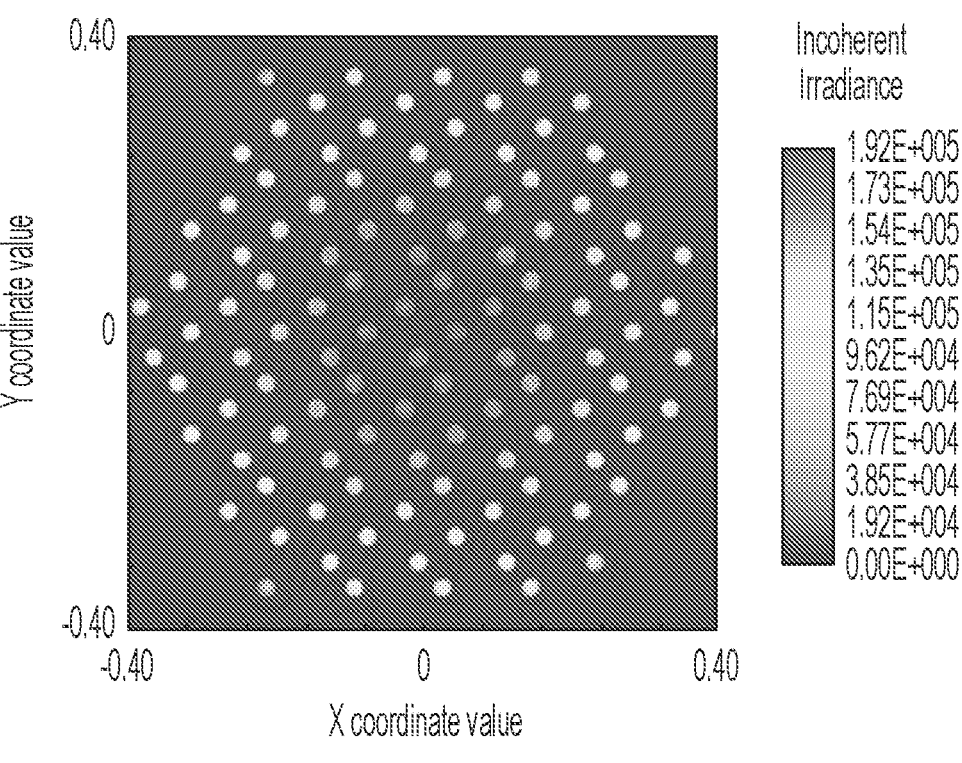
Figure 19H:
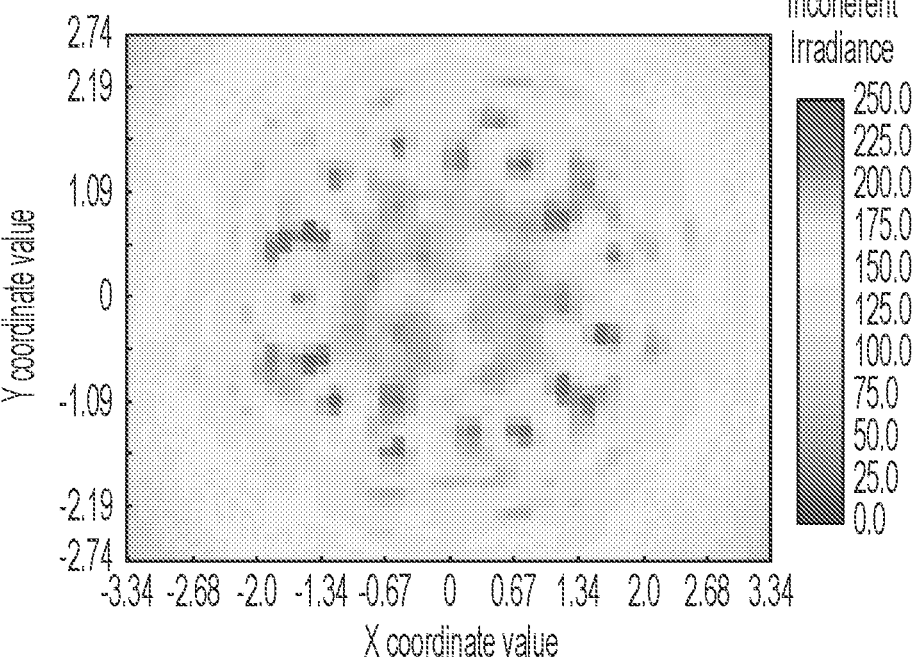

In some embodiments, the micro-LED array may use dithering to reduce the appearance of quantization patterns in the output of the exit pupil of the light source to increase the visual uniformity of the output across the image generator. FIGS. 19A-19H illustrate an example micro-LED array that includes a slight dither of the micro-LED elements from their center position. FIG. 19A illustrates an irradiance of all micro-LEDs included in the array measured at the exit pupil of the light source, e.g., exit opening of the reflector. In some embodiments, the micro-LED elements may have a dither of +/−5 μm. FIG. 19A illustrates dithering where the spacing of micro-LED elements appears irregular, e.g., compared to FIG. 17D. FIG. 19B illustrates an irradiance of image light reflected by the image generator of the optical system with the micro-LED array 1900. FIG. 19C illustrates an irradiance of light exiting the pupil of a reflector with the micro-LED array 1900 for a single color of the three colors, e.g., where micro-LED sources corresponding to the single color are emitting simultaneously. FIG. 19D illustrates an irradiance of image light reflected by the image generator of the optical system with the single color shown in FIG. 19C. FIG. 19E illustrates a dithering configuration where each row of the micro-LED array is offset by a different amount and elements in the same row can be offset by the same amount. For example, the offsets of the rows may be either 7 μm, 14 μm, or 21 μm. FIG. 19F illustrates an irradiance of image light reflected by the image generator of the optical system with the single color shown in FIG. 19E. FIG. 19G illustrates a dithering configuration where four offset values are repeated. As shown in the figure, the offset may include a set of four rows with an offset of −14 μm, −5 μm, 4 μm, and 13 μm, where this offset configuration can be repeated. FIG. 19H illustrates an irradiance of image light reflected by the image generator of the optical system with the single color shown in FIG. 19G.

Figure 20:
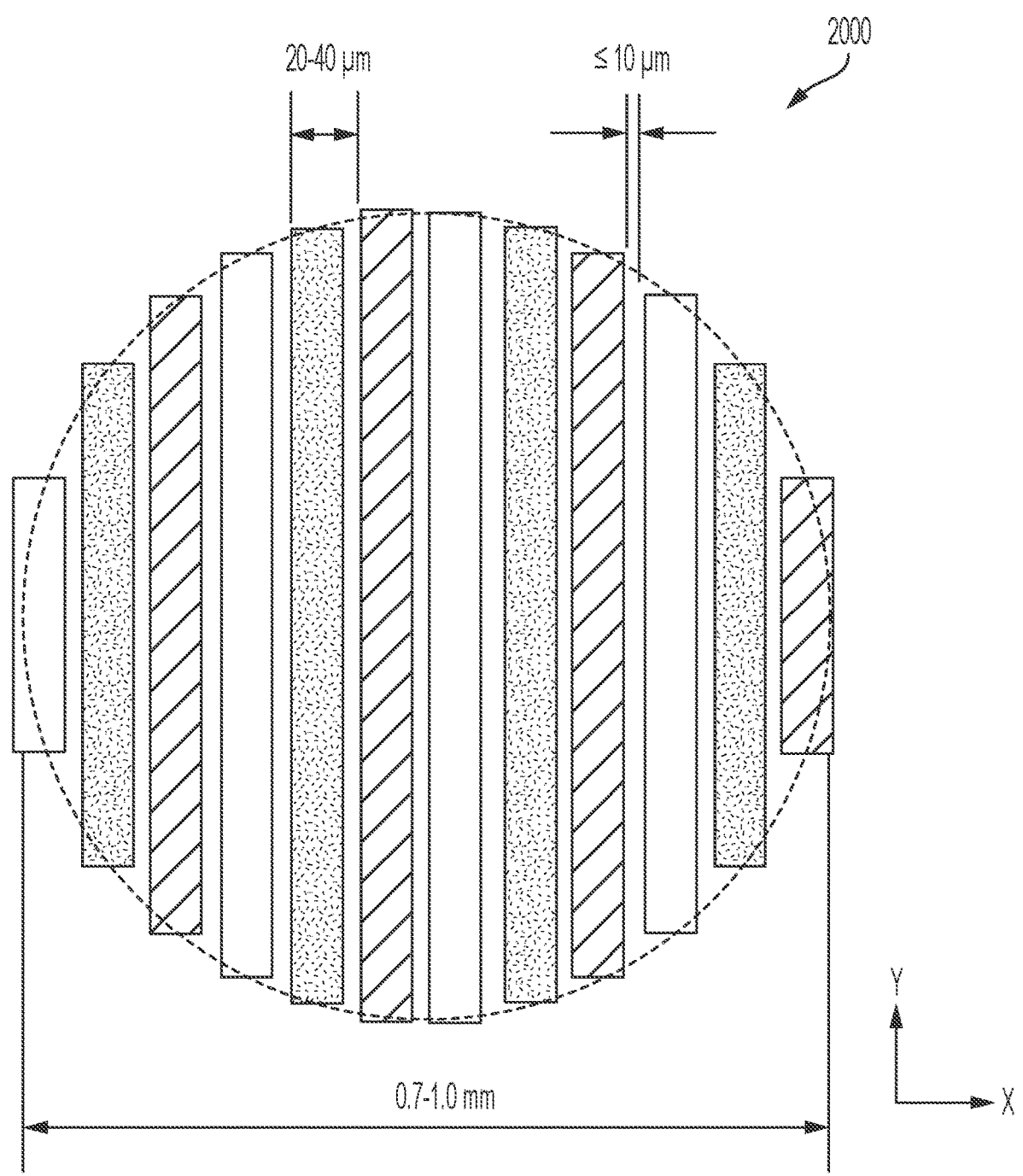
FIG. 20 illustrates an example micro-LED array for an example optical system, according to one or more embodiments of the disclosure.

FIG. 20 illustrates a layout of a micro-LED array 2000 in accordance with embodiments of this disclosure. As shown in this figure the micro-LED array 2000 may have a stripe configuration such that each micro-LED comprises a plurality of stripes that extend across the micro-LED array from end to end. For example, micro-LED array may include a plurality of vertical stripes, where a length of the stripes can vary based on the location of the stripe along the x-axis of the micro-LED array. In some embodiments, the stripes may be rectangular in shape with a width of about 10-40 μm. The spacing between stripes may be about 10 μm or less. In some embodiments, the micro-LED array may have a diameter of about 0.7-1.00 mm. In some embodiments, the stripes may be arranged horizontally in rows such that the length of the stripes can vary based on the location of the stripe along the y-axis.

The micro-LED array 2000 may include micro-LED sources corresponding to the primary colors, red, green and blue. This figure illustrates the configuration of all micro-LED sources in the array 2000, e.g., corresponding to all three colors. In some embodiments all the micro-LEDs in the array may include micro-LED sources corresponding to three colors, e.g., red, green, and blue. In some embodiments, the three colors may be arranged in sets that repeat, e.g., repeating red-green-blue, repeating blue-red-green, etc. In some embodiments, the width of the stripes corresponding to different colors may vary. For example, stripes corresponding to red may have a first width, stripes corresponding to green may have a second width, and stripes corresponding to blue may have a third width, where the first, second and third widths are different. The relative width of the stripes corresponding to different colors (e.g., wavelengths) may be based on a desired optical power of a particular color. In some embodiments, the width of the stripes may vary based on its relative location in the micro-LED array, e.g., narrower stripes located near the center of the micro-LED array and wider stripes located near the edges.

Referring to FIG. 10, in some embodiments, the micro-LED array 1040 may be located in the bottom of the reflector 1050 across the light input opening 1051. In other embodiments, the micro-LED array may be displaced from the bottom of the reflector, e.g., the micro-LED may be located at a different position along longitudinal axis of the reflector, where the longitudinal axis corresponds to an axis that is perpendicular to the light input opening and the light output opening of the reflector. In some examples, moving the micro-LED array in the z-direction may affect the focus and efficiency of the light output from the light output exit, e.g., exit pupil of the reflector.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A display system comprising:
a single pupil light source configured to emit a first light, wherein the light source comprises:
a reflector; and
a micro-LED array disposed in the reflector,
wherein the micro-LED array is configured to output the first light comprising light of a plurality of different colors, wherein the micro-LED array comprises:
a plurality of micro-LEDs, each micro-LED of the plurality of micro-LEDs configured to output light of one of the plurality of colors,
wherein positions of the micro-LEDs are dithered, wherein micro-LEDs of the plurality of micro-LEDs are offset from associated centered positions for the respective micro-LED;
a lens configured to receive the first light;
an image generator configured to receive the first light and emit a second light; and
a plurality of waveguides, wherein at least two of the plurality of waveguides each include an in-coupling grating configured to selectively couple the second light.

2. The display system of claim 1, wherein the micro-LED array includes at least a first plurality of micro-LED sources configured to emit at a first wavelength and a second plurality of micro-LEDs sources configured to emit at a second wavelength.

3. The display system of claim 2, wherein at least a first in-coupling grating is configured to incouple light corresponding to the first wavelength and a second in-coupling grating is configured to incouple light corresponding to the second wavelength.

4. The display system of claim 1, wherein the light source is configured to emit light of a first color at a first time and light of a second color at a second time, wherein the second time is different than the first time.

5. The display system of claim 1, wherein the in-coupling gratings of the at least two plurality of waveguides are aligned.

6. The display system of claim 1, wherein the micro-LEDs are arranged in rows, wherein positions of micro-LEDs of different rows are offset by different amounts, and wherein positions of micro-LEDs of each row are offset by a same amount.

7. The display system of claim 1, wherein the reflector comprises a compound parabolic concentrator reflector.

8. A head wearable device comprising:

a display system comprising:

a single pupil light source configured to emit a first light, wherein the light source comprises:

a reflector; and a micro-LED array disposed in the reflector, wherein the micro-LED array is configured to output the first light comprising light of a plurality of different colors, wherein the micro-LED array comprises:

a plurality of micro-LEDs, each micro-LED of the plurality of micro-LEDs configured to output light of one of the plurality of colors, wherein positions of the micro-LEDs are dithered, wherein micro-LEDs of the plurality of micro-LEDs are offset from associated centered positions for the respective micro-LED;

a lens configured to receive the first light;

an image generator configured to receive the first light and emit a second light; and a plurality of waveguides, wherein at least two of the plurality of waveguides each include an in-coupling grating configured to selectively couple the second light.

9. The head wearable device of claim 8, wherein the micro-LED array includes at least a first plurality of micro-LED sources configured to emit at a first wavelength and a second plurality of micro-LEDs sources configured to emit at a second wavelength.

10. The head wearable device of claim 9, wherein at least a first in-coupling grating is configured to incouple light corresponding to the first wavelength and a second in-coupling grating is configured to incouple light corresponding to the second wavelength.

11. The head wearable device of claim 9, wherein the light source is configured to emit light of a first color at a first time and light of a second color at a second time, wherein the second time is different than the first time.

12. The head wearable device of claim 8, wherein the in-coupling gratings of the at least two plurality of wave-guides are aligned.

13. The head wearable device of claim 8, wherein the micro-LEDs are arranged in rows, wherein positions of micro-LEDs of different rows are offset by different amounts, and wherein positions of micro-LEDs of each row are offset by a same amount.

14. The head wearable device of claim 8, wherein the reflector comprises a compound parabolic concentrator reflector.

15. A display system comprising:

a single pupil light source comprising:

a reflector having an entrance opening and an exit opening; and a micro-LED array disposed in the reflector and proximate the entrance opening, wherein the micro-LED array is configured to output light of a plurality of different colors, wherein the micro-LED array comprises;

a plurality of independently controllable micro-LEDs each configured to output light of one of the plurality of colors, wherein positions of the micro-LEDs are dithered, wherein micro-LEDs of the plurality of micro-LEDs are offset from associated centered positions for the respective micro-LED.

16. The display system of claim 15, wherein the reflector comprises a compound parabolic concentrator reflector.

17. The display system of claim 15, wherein the micro-LED array comprises a plurality of micro-LEDs arranged in at least one selected from a group consisting of a square configuration, a rectangular configuration, a hexagonal configuration, a radial configuration, and a stripe configuration.

18. The display system of claim 15, wherein the micro-LEDs are arranged in rows, wherein positions of micro-LEDs of different rows are offset by different amounts, and wherein positions of micro-LEDs of each row are offset by a same amount.

19. The display system of claim 15, wherein the micro-LED array is configured to emit light of at least three colors.

20. The display system of claim 15, wherein the micro-LED array is disposed across the entrance opening.

\*     \*     \*     \*     \*